(12) United States Patent
Tinnakornsrisuphap et al.

(10) Patent No.: US 8,996,716 B2
(45) Date of Patent: Mar. 31, 2015

(54) REMOTE ACCESS TO LOCAL NETWORK VIA SECURITY GATEWAY

(75) Inventors: Peerapol Tinnakornsrisuphap, San Diego, CA (US); Anand Palanigounder, San Diego, CA (US); Ranjith S. Jayaram, Bridgewater, NJ (US); Lakshminath R. Dondeti, Hyderabad (IN); Jun Wang, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 424 days.

(21) Appl. No.: 12/619,174

(22) Filed: Nov. 16, 2009

(65) Prior Publication Data
US 2010/0125899 A1 May 20, 2010

Related U.S. Application Data

(60) Provisional application No. 61/115,520, filed on Nov. 17, 2008, provisional application No. 61/145,424, filed on Jan. 16, 2009, provisional application No. 61/150,624, filed on Feb. 6, 2009, provisional application No. 61/164,292, filed on Mar. 27, 2009.

(51) Int. Cl.
*G06F 15/16* (2006.01)
*H04W 92/02* (2009.01)
(Continued)

(52) U.S. Cl.
CPC ........... *H04W 92/02* (2013.01); *H04L 63/0272* (2013.01); *H04L 63/101* (2013.01);
(Continued)

(58) Field of Classification Search
CPC ... H04L 12/4633; H04L 45/566; H04L 45/16; H04L 12/66
USPC .................................. 709/232, 245; 370/355
See application file for complete search history.

(56) References Cited

U.S. PATENT DOCUMENTS 6,061,650 A    5/2000 Malkin et al.
7,299,301 B1 * 11/2007 Verma et al. .................. 709/249
(Continued)

FOREIGN PATENT DOCUMENTS

CN          1956424 A       5/2007
EP          1455480 B1      7/2008
(Continued)

OTHER PUBLICATIONS

International Search Report and Written Opinion—PCT/US2009/064634, International Search Authority—European Patent Office—Jun. 29, 2010.
(Continued)

*Primary Examiner* — Tesfay Yohannes

(57) ABSTRACT

Multiple protocol tunnels (e.g., IPsec tunnels) are deployed to enable an access terminal that is connected to a network to access a local network associated with a femto access point. A first protocol tunnel is established between a security gateway and the femto access point. A second protocol tunnel is then established in either of two ways. In some implementations the second protocol tunnel is established between the access terminal and the security gateway. In other implementations the second protocol tunnel is established between the access terminal and the femto access point, whereby a portion of the tunnel is routed through the first tunnel.

39 Claims, 15 Drawing Sheets

(51) Int. Cl.
*H04W 12/06* (2009.01)
*H04W 76/02* (2009.01)
*H04L 29/06* (2006.01)
*H04W 84/04* (2009.01)
*H04W 84/10* (2009.01)
*H04W 88/16* (2009.01)

(52) U.S. Cl.
CPC ............. *H04L63/164* (2013.01); *H04W 12/06* (2013.01); *H04W 76/022* (2013.01); *H04W 84/045* (2013.01); *H04W 84/105* (2013.01); *H04W 88/16* (2013.01)
USPC ........................... 709/232; 709/245; 370/355

(56) References Cited

U.S. PATENT DOCUMENTS

| | | | |
|---|---|---|---|
| 7,554,967 | B1 | 6/2009 | Varadhan et al. |
| 7,675,882 | B2 | 3/2010 | Mighani et al. |
| 7,739,728 | B1 | 6/2010 | Koehler, Jr. et al. |
| 8,046,829 | B2* | 10/2011 | Oba ................. 726/14 |
| 8,184,530 | B1* | 5/2012 | Swan et al. .......... 370/230 |
| 2004/0006708 | A1 | 1/2004 | Mukherjee et al. |
| 2004/0029555 | A1* | 2/2004 | Tsai et al. ............ 455/403 |
| 2004/0103311 | A1* | 5/2004 | Barton et al. ............ 713/201 |
| 2004/0141601 | A1 | 7/2004 | Cai et al. |
| 2005/0144437 | A1 | 6/2005 | Ransom et al. |
| 2005/0163146 | A1* | 7/2005 | Ota et al. ............ 370/432 |
| 2006/0126603 | A1 | 6/2006 | Shimizu et al. |
| 2006/0143702 | A1 | 6/2006 | Hisada et al. |
| 2006/0291448 | A1 | 12/2006 | Hellgren et al. |
| 2007/0060147 | A1* | 3/2007 | Shin et al. ............ 455/445 |
| 2007/0213057 | A1* | 9/2007 | Shaheen ............ 455/436 |
| 2007/0250642 | A1* | 10/2007 | Thubert et al. ............ 709/245 |
| 2008/0076393 | A1 | 3/2008 | Khetawat et al. |
| 2008/0080533 | A1 | 4/2008 | Yamane |
| 2008/0133530 | A1 | 6/2008 | Wang et al. |
| 2008/0141021 | A1 | 6/2008 | Hsu et al. |
| 2008/0207170 | A1 | 8/2008 | Khetawat et al. |
| 2008/0212495 | A1 | 9/2008 | Stirbu |
| 2008/0244148 | A1 | 10/2008 | Nix, Jr. et al. |
| 2009/0037998 | A1 | 2/2009 | Adhya et al. |
| 2009/0094351 | A1* | 4/2009 | Gupta et al. ............ 709/220 |
| 2009/0113073 | A1* | 4/2009 | Koide et al. ............ 709/245 |
| 2009/0156213 | A1 | 6/2009 | Spinelli et al. |
| 2009/0168721 | A1* | 7/2009 | Chen ............ 370/331 |
| 2010/0008260 | A1* | 1/2010 | Kim et al. ............ 370/254 |
| 2010/0027533 | A1* | 2/2010 | Kant et al. ............ 370/355 |
| 2010/0124228 | A1 | 5/2010 | Tinnakornsrisuphap et al. |
| 2010/0136943 | A1* | 6/2010 | Hirvela et al. ............ 455/404.1 |
| 2010/0281251 | A1* | 11/2010 | Arauz Rosado ............ 713/152 |

FOREIGN PATENT DOCUMENTS

| | | |
|---|---|---|
| EP | 1983771 A1 | 10/2008 |
| JP | 2000271140 A | 10/2000 |
| JP | 2004274184 A | 9/2004 |
| JP | 2006148661 A | 6/2006 |
| JP | 2007518349 A | 7/2007 |
| JP | 2008072473 A | 3/2008 |
| JP | 2008271140 A | 11/2008 |
| JP | 2010521097 A | 6/2010 |
| JP | 2010525643 A | 7/2010 |
| WO | WO-2005069577 A1 | 7/2005 |
| WO | WO2006059216 A1 | 6/2006 |
| WO | WO2006121278 | 11/2006 |
| WO | WO2007136339 A2 | 11/2007 |
| WO | WO2008054270 A1 | 5/2008 |
| WO | 2008070251 | 6/2008 |
| WO | WO2008090519 | 7/2008 |
| WO | WO2008108717 A1 | 9/2008 |
| WO | WO2008110215 | 9/2008 |
| WO | WO-2008125657 A1 | 10/2008 |
| WO | WO2008125729 | 10/2008 |

OTHER PUBLICATIONS

International Search Report and Written Opinion—PCT/US2009/064648, International Search Authority—European Patent Office—Jul. 2, 2010.
Partial International Search Report—Invitation to Pay Additional Fees—PCT/US2009/064634, International Search Authority—European Patent Office—Mar. 2, 2010.
Partial International Search Report—Invitation to Pay Additional Fees—PCT/US2009/064648, International Search Authority—European Patent Office—Mar. 5, 2010.
European Search Report—EP12151776—Search Authority—Munich—Mar. 23, 2012.
European Search Report—EP12151784—Search Authority—Munich—Apr. 3, 2012.
Taiwan Search Report—TW098139039—TIPO—Sep. 3, 2013.

* cited by examiner

US 8,996,716 B2

REMOTE ACCESS TO LOCAL NETWORK VIA SECURITY GATEWAY

CLAIM OF PRIORITY

This application claims the benefit of and priority to commonly owned U.S. Provisional Patent Application No. 61/115,520, filed Nov. 17, 2008, U.S. Provisional Patent Application No. 61/145,424, filed Jan. 16, 2009, U.S. Provisional Patent Application No. 61/150,624, filed Feb. 6, 2009, and U.S. Provisional Patent Application No. 61/164,292, filed Mar. 27, 2009, the disclosure of each of which is hereby incorporated by reference herein.

CROSS-REFERENCE TO RELATED APPLICATION

This application is related to concurrently filed and commonly owned U.S. patent application Ser. No. 12/619,162, entitled "REMOTE ACCESS TO LOCAL NETWORK," the disclosure of which is hereby incorporated by reference herein.

BACKGROUND

1. Field

This application relates generally to wireless communication and more specifically, but not exclusively, to improving communication performance.

2. Introduction

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

To supplement conventional mobile phone network access points, small-coverage access points may be deployed (e.g., installed in a user's home) to provide more robust indoor wireless coverage to mobile access terminals. Such small-coverage access points may be referred to as femto access points, access point base stations, Home eNodeBs ("HeNBs"), Home NodeBs, or home femtos. Typically, such small-coverage access points are connected to the Internet and the mobile operator's network via a DSL router or a cable modem.

In some cases, one or more local services may be deployed at the same location as a small-coverage access point. For example, a user may have a home network that supports a local computer, a local printer, a server, and other components. In such cases, it may be desirable to provide access to these local services via the small-coverage access point. For example, a user may wish to use his or her cell phone to access a local printer when the user is at home.

In general, a node on the public Internet may not be able to initiate communication with a device on a home network because this device is protected by a firewall and the network address translator (NAT) within the home router. Accordingly, a need exists for efficient and effective methods for remotely accessing a local network.

SUMMARY

A summary of sample aspects of the disclosure follows. In the discussion herein, any reference to the term aspects may refer to one or more aspects of the disclosure.

The disclosure relates in some aspects to using multiple protocol tunnels (e.g., IPsec tunnels) to enable an access terminal that is connected to a network (e.g., an operator's network, the Internet, etc.) to access a local network associated with a femto access point. A first protocol tunnel is established between a security gateway and the femto access point. A second protocol tunnel is then established in either of two ways. In some implementations the second protocol tunnel is established between the access terminal and the security gateway. In other implementations the second protocol tunnel is established between the access terminal and the femto access point, whereby a portion of the tunnel is routed through the first tunnel.

Through the use of these schemes, an access terminal may reach a local Internet Protocol (IP) network or server that is in the same domain as a femto access point even when the access terminal is not connected over-the-air with the femto access point. Thus, a remotely located access terminal may be provided with the same local IP capability as when the access terminal is connected to the femto access point over-the-air.

BRIEF DESCRIPTION OF THE DRAWINGS

These and other sample aspects of the disclosure will be described in the detailed description and the appended claims that follow, and in the accompanying drawings, wherein:

Figure 1:
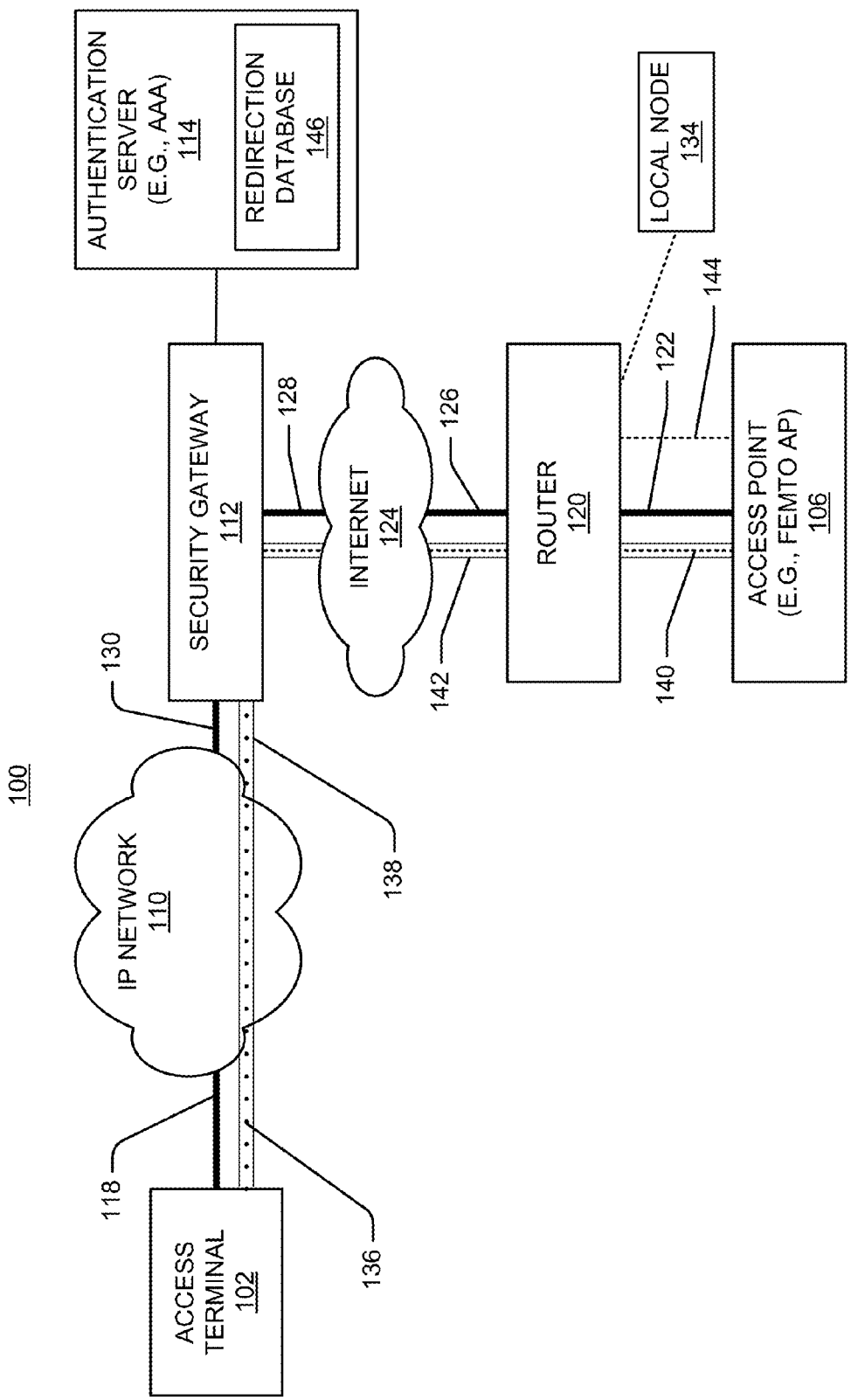
FIG. 1 is a simplified block diagram of several sample aspects of a communication system where an access terminal remotely accesses a local network via protocol tunnels terminating at a security gateway.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network nodes that communicate with one another. It should be appreciated, however, that the teachings herein may be applicable to other types of apparatuses or other similar apparatuses that are referenced using other terminology. For example, in various implementations access points may be referred to or implemented as base stations or eNodeBs, access terminals may be referred to or implemented as user equipment or mobiles, and so on.

Access points in the system 100 provide one or more services (e.g., network connectivity) for one or more wireless terminals (e.g., access terminal 102) that may be installed within or that may roam throughout a coverage area of the system 100. For example, at various points in time the access terminal 102 may connect to an access point an access point 106 (e.g., a femto access point associated with a local network) or other access points (e.g., macro access points, not shown in FIG. 1). Each of the access points may communicate with one or more network nodes to facilitate wide area network connectivity.

These network nodes may take various forms such as, for example, one or more radio and/or core network entities. Thus, in various implementations a network node may provide functionality such as at least one of: network management (e.g., via an operation, administration, management, and provisioning entity), call control, session management, mobility management, gateway functions, interworking functions, or some other suitable network functionality. In the example of FIG. 1, sample network nodes are represented by, a public switched data network (PSDN) 108, an operator core network cloud 110, a security gateway 112 (e.g., a femto security gateway), and an authentication server 114 (e.g., an authentication, authorization, and accounting (AAA) entity; a visiting location register (VLR), or a home location register (HLR)).

The nodes in the system 100 may employ various means to communicate with one another. Depending on its location, the access terminal 102 may communicate with an IP network 110 (e.g., to an access point of the IP network 110, not shown) or the access point 106. In the example of FIG. 1, the access terminal 102 is connected to an IP network 110 as represented by a communication link 118 (e.g., via a wireless or wired connection). The access point 106 may connect to a router 120 as represented by a communication link 122, the router 120 may connect to the Internet 124 as represented by a communication link 126, the security gateway 112 may connect to the Internet 124 as represented by a communication link 128, and the security gateway 112 may connect to the IP network 110 as represented by a communication link 130.

Through the use of these communication links, the access terminal 102 may communicate with various nodes in the system 100. When the access terminal 102 is connected to the IP network, the access terminal 102 may, for example, access services via an operator core network (e.g., the core network of a cellular network) or some other network. Thus, the access terminal 102 may communicate with other access terminals and other networks.

When the access terminal 102 is connected to the access point 106, the access terminal may access nodes on a local network on which the access point 106 resides along with one or more local nodes (represented by local node 134). The local node 134 may represent a device that resides on the same IP subnetwork as the access point 106 (e.g., a local area network served by the router 120). In this case, accessing the local network may involve accessing a local printer, a local server, a local computer, another access terminal, an appliance (e.g., a security camera, an air conditioner, etc.), or some other entity on the IP subnetwork. When connected to the access point 106, the access terminal 102 may access the local network without going through the operator core network 110. In this way, the access terminal 102 may efficiently access certain services when the access terminal is, for example, at a home network or some other local network.

When the access terminal 102 is connected to some other access point (e.g., the access terminal 102 is operating remotely in another network), the access terminal 102 may not be able to readily access the local network due to a firewall at the router 120. In the discussion that follows two architectures are described for enabling an access terminal to remotely access a local network.

Figure 2:
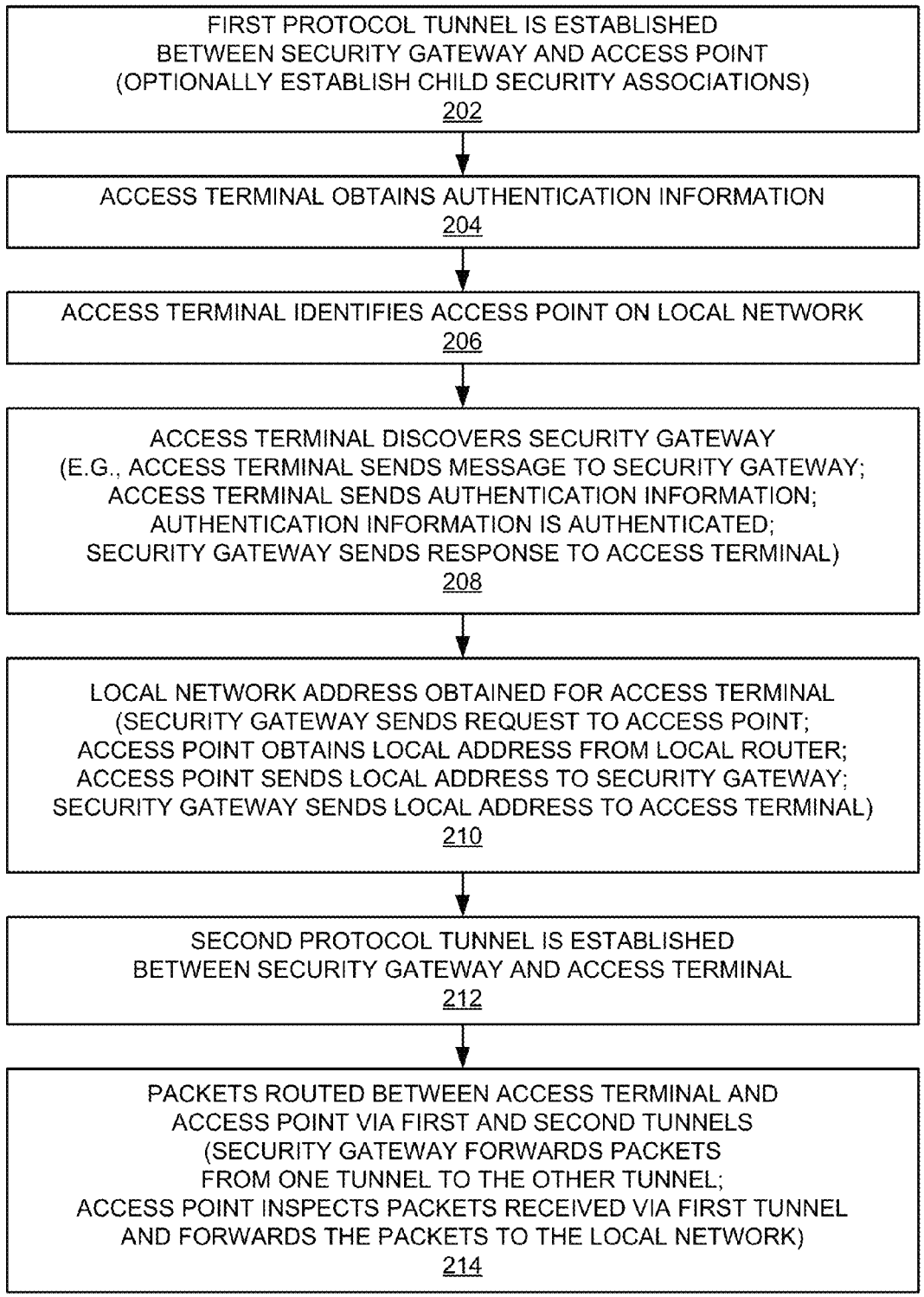
FIG. 2 is a flowchart of several sample aspects of operations that may be performed to provide remote access to a local network via protocol tunnels terminating at a security gateway.

FIGS. 1 and 2 describe an architecture that employs two protocol tunnels, both of which terminate at the security gateway 112. The first protocol tunnel is established between the security gateway 112 and the access point 106. The second protocol tunnel is established between the security gateway 112 and the access terminal 102.

Figure 4:
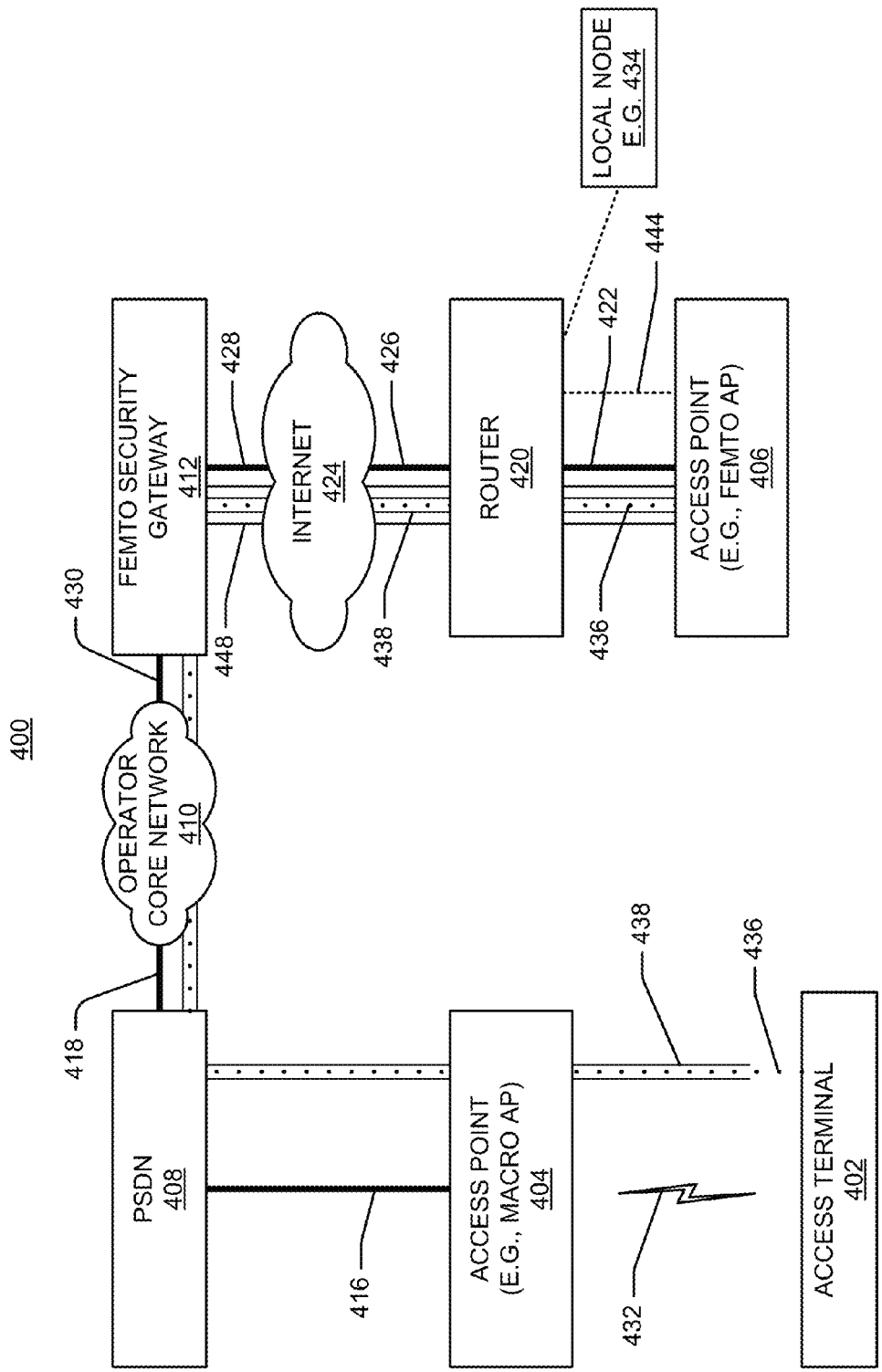
FIG. 4 is a simplified block diagram of several sample aspects of a communication system where an access terminal remotely accesses a local network via layered protocol tunnels.
Figure 5:
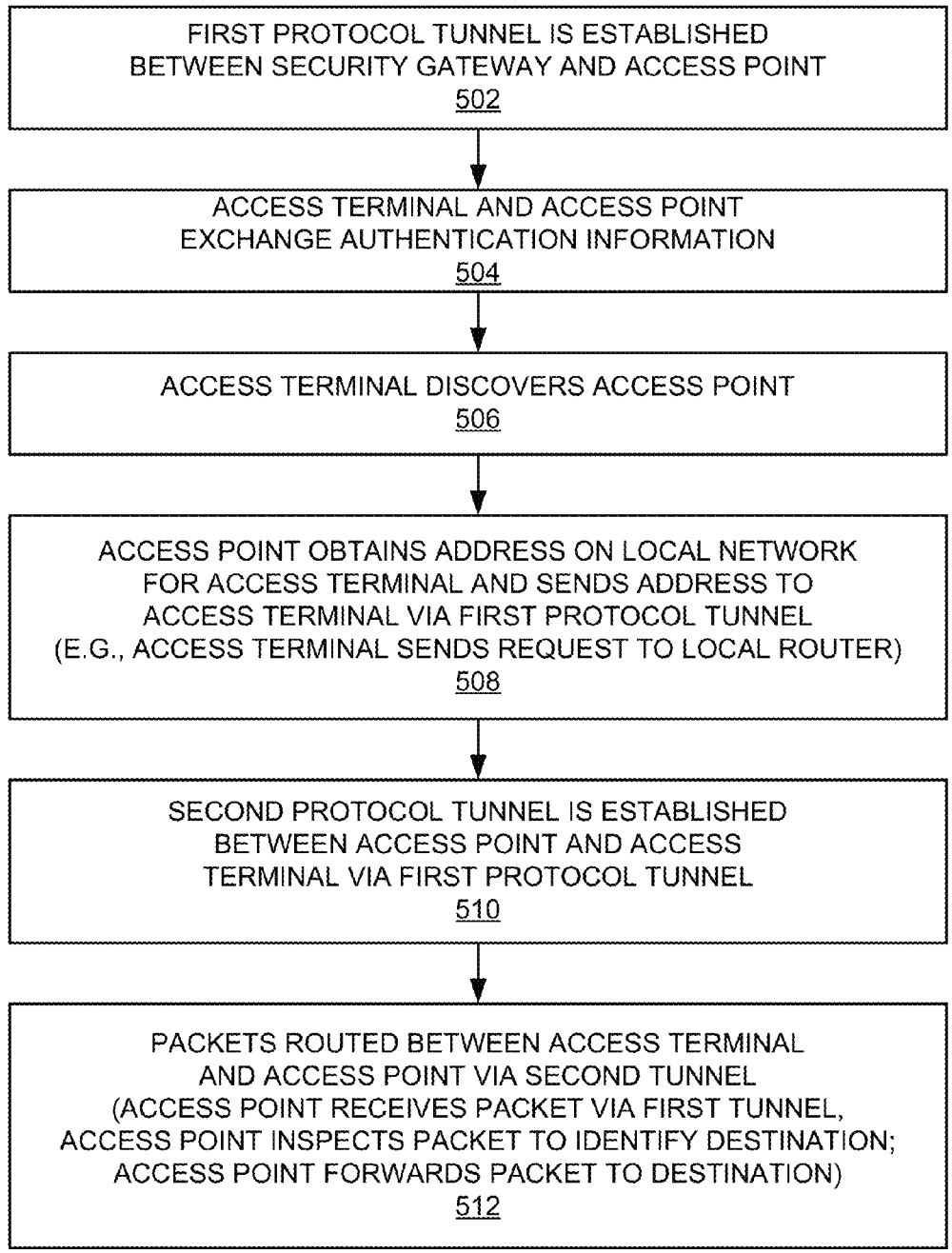
FIG. 5 is a flowchart of several sample aspects of operations that may be performed to provide remote access to a local network via layered protocol tunnels.

FIGS. 4 and 5 describe an architecture that employs two protocol tunnels, both of which terminate at the access point 106. The first protocol tunnel is established between the security gateway 112 and the access point 106. The second protocol tunnel is established between the access point 106 and the access terminal 102, whereby a portion of the second protocol tunnel is established within the first protocol tunnel.

In some aspects, these architectures may make use of an IP port opened by the protocol tunnel established between the security gateway 112 and the access point 106 to enable remote access. In the architecture of FIG. 1, the security gateway 112 inspects the packets received via the tunnel from the access terminal 102 and forwards these packets to the tunnel to the access point 106. In the architecture of FIG. 4, the security gateway simply routes tunneled inbound packets from the access terminal 102 to tunnel to the access point 106, and vice versa.

Advantageously, these architectures may have good synergy with conventional femto access point implementations. For example, a femto access point that supports local IP access may already support assigning local IP addresses for access terminals and performing proxy address resolution protocol (ARP) functions. In addition, a femto access point may already have a persistent IPsec tunnel with its femto security gateway that traverses through any network address translation (NAT) between the femto access point and the femto security gateway. Also, there may be no need to provision additional authentication information (e.g., authentication information) for remote access terminal access (e.g., for authentication, authorization, and secure IPsec tunnel). The authentication information for remote access may be derived using one of the existing authentication information that the access terminal shares with the local (e.g., home) network or the operator's network.

The following implementation details may be used in conjunction with the described architectures. An operator may offer remote IP access as an add-on service on a subscription basis. Capabilities such as DHCP/ARP are available at the femto access point to support remote IP access. Femto access points that can be reached by a given access terminal may be configured as part of the access terminal (subscription) profile at a home authentication server. Femto access points may be identified by a femto identifier or by realm (e.g., useful for groups of femto access points in enterprise deployments). A user may invoke the service on demand at the access terminal (e.g., by clicking "My Home").

Referring again to FIG. 1, sample aspects of this architecture will now be described in more detail. The security gateway 112 acts as a virtual private network (VPN) gateway for a protocol tunnel established with the access terminal 102. In FIG. 1, traffic flow between the access terminal 102 and the security gateway 112 (e.g., via links 118, and 130) is represented by dotted line 136 routed via a protocol tunnel (e.g., an IPsec tunnel) as represented by a pair of lines 138. Here, the inner source and destination addresses of a packet sent by the access terminal will have local network addresses (e.g., as assigned by the router 120), while the outer source and destination addresses will be, for example, the macro IP address of the access terminal 102 and the IP address of the security gateway 112, respectively.

The security gateway 112 forwards any packets received from the access terminal 102 to the access point 106 via a protocol tunnel established with the access point 106. In FIG. 1, traffic flow between the security gateway 112 and the femto access point 106 (e.g., via links 128, 126, and 120) is represented by dotted line 140 within a protocol tunnel (e.g., an IPsec tunnel) as represented by a pair of lines 142. In this tunnel, the inner source and destination addresses of packet sent by the access terminal will again be the local network addresses discussed in the previous paragraph, while the outer source and destination addresses will be, for example, defined by the tunnel 142.

Access terminal authentication is performed with the authentication server 114 (e.g., a home AAA) using a suitable algorithm. For example, some implementations may employ IKEv2 EAP-AKA or IKEv2 PSK (e.g., reusing the existing IP subscription authentication information for the access terminal, e.g., as configured by an operator). The femto access point may provide DHCP server functionality which the security gateway 112 may request local IP to assign to the access terminal as part of IKEv2.

The security gateway 112 forwards selected packets from the access point 106 to the access terminal 102 (e.g., based on a forwarding policy or a target address). The security gateway 112 is reachable via the macro IP address of the access terminal 102. Through the use of the above scheme, the access terminal 102 may use any available IP connectivity for remote IP access.

In some implementations (e.g., when the access terminal 102 is on a remote network that is different than the operator network for the access point 102), an address conflict may arise when routing packets from the access point 106 to the access terminal 102. To address this issue, separate child security associations (CSAs) may be defined for the tunnel 142. For example, a first CSA may be used to route traffic from the access point 106 that is destined for the access terminal 102 (e.g., remote IP access traffic). A second CSA may then be used to route traffic from the access point 106 that is destined for the operator core network 110. The security gateway 112 may determine where to route a packet received from the access point 106 based on which CSA the packet was received on. CSAs may be advantageously employed here since another unique protocol tunnel need not be defined and the authentication information of the tunnel 142 may be reused.

Sample operations of the system 100 will now be described in more detail in conjunction with the flowchart of FIG. 2. For convenience, the operations of FIG. 2 (or any other operations discussed or taught herein) may be described as being performed by specific components (e.g., components of the system 100). It should be appreciated, however, that these operations may be performed by other types of components and may be performed using a different number of components. It also should be appreciated that one or more of the operations described herein may not be employed in a given implementation.

As represented by block 202, at some point in time (e.g., when the access point 106 is deployed) a first protocol tunnel is established between the security gateway 112 and the access point 106. Here, the security gateway 112 and the access point 106 each perform corresponding operations to establish the protocol tunnel. This may involve, for example, exchanging messages to allocate cryptographic keys for encrypting and decrypting information sent over the protocol tunnel 142. In addition, as mentioned above, CSAs may be established for this protocol tunnel.

As represented by block 204, at some point in time the access terminal 102 obtains authentication information. For example, the wireless operator for the access terminal 102 may assign authentication information when the access terminal is first provisioned.

As represented by block 206, at some point in time the access terminal 102 may identify an access point (e.g., access point 106) on a local network. For example, the access terminal 102 may be associated with a home femto access point when either of these devices is provisioned.

As represented by block 208, at some point in time the access terminal 102 discovers the security gateway associated with the access point 106. For example, the access terminal 102 may be at a location that is outside the wireless coverage of the access point 106, yet is able to connect to some other network (e.g., a wireless operator's macro network). In this case, the access terminal 102 may attempt to locate the security gateway that is associated with the access point 106 so that the access terminal 102 may gain access to its local network. As discussed in more detail in conjunction with FIG. 3, this may involve, for example, the access terminal 102 sending a message to one or more security gateways to find the security gateway that has established a tunnel to the access point 106. In conjunction with this message, the access terminal 102 sends its authentication information to the security gateway. The security gateway then takes appropriate action to authenticate the authentication information (e.g., by communicating with the authentication server 114). For example, the security gateway may send the subscription information for the access terminal 102 to the authentication server 114. The authentication server 114 maintains a list a femto access points that may be accessed as part of the subscription profile for the access terminal 102 (i.e., the access terminal subscription profile determines whether a given user is authorized to use a given femto access point). Based on an identifier (e.g., NAI) received during authentication (e.g., an identifier obtained as a result of a message sent by the access terminal 102 to the security gateway 112), the authentication server 114 returns one or more femto identifiers to the security gateway, e.g., identifying the femto access points that the access terminal 102 is allowed to access (assuming the access terminal 102 is successfully authenticated). The received identifier may also additionally comprise (e.g., imply or have imbedded within) the identity of the femto access point that the access terminals want to access (e.g., contained as part of the NAI). If multiple femto identifiers are returned, the security gateway selects a femto identifier (e.g., based on the availability of an IPsec tunnel to the femto access point and any preference indicated by the access terminal 102). In the event the security gateway has established a tunnel to the access point 106 (e.g., the access terminal 102 has queried the security gateway 112) and the authentication information of the access terminal 102 has been authenticated, the security gateway sends a response to the access terminal and the entities commence setting up the protocol tunnel 138.

As represented by block 210, in conjunction with setting up the protocol tunnel 138, an address on the local network is obtained for the access terminal 102. For example, the security gateway 112 may send a message to the access point 106 requesting a local address on behalf of the access terminal 102. As one example, in a CSA dedicated to remote IP access, the security gateway 112 sends a DHCP request or router solicitation via the tunnel 142 to the access point 106 to request a remote IP address for the access terminal 102. The access point 106 may then send a request to the router 120 for the local address. Once the access point 106 obtains the local address, the access point 106 sends the local address to the security gateway 112. The security gateway 112 then forwards the local address to the access terminal 102 (e.g., once the protocol tunnel 138 is established). For example, the assigned address may be sent to the access terminal 102 via an IKE AUTH message.

As represented by block 212, the security gateway 112 and the access terminal 102 each perform corresponding operations to establish the protocol tunnel 138. This may involve, for example, exchanging messages to allocate cryptographic keys for encrypting and decrypting information sent over the protocol tunnel 138.

As represented by block 214, once the protocol tunnel 138 is established, packets may be routed between the access terminal 102 and the access point 106 via the protocol tunnels 138 and 142. Here, the security gateway 112 routes packets it receives via one tunnel to the other tunnel. This may be accomplished in various ways. In some cases, a forwarding policy is established at the time of setting up the protocol tunnels. Thus, when a packet is received via a given tunnel, that packet is forwarded based on the policy. Here, the security gateway 112 may identify a packet from a given tunnel based on, for example, the IPsec protocol header encapsulating the packet. In some cases, the security gateway 112 inspects the packets to obtain an identifier of the source (e.g., the access terminal 102) and/or the destination (e.g., the access point 106) for the packet. The security gateway 112 may then determine the appropriate tunnel for forwarding the packet based on this extracted identifier information.

The access point 106 routes packets between the tunnel 142 and the local network. For example, when a packet is received at the access point 106 via the tunnel 142, the access point 106 inspects the packet to identify the destination for the packet on the local network. The access point 106 and forwards the packet to the identified destination. FIG. 1 illustrates a sample data path 144 for packet flow between the access point 106 and the local node 134 of the local network (e.g., via the router 120).

Figure 3:
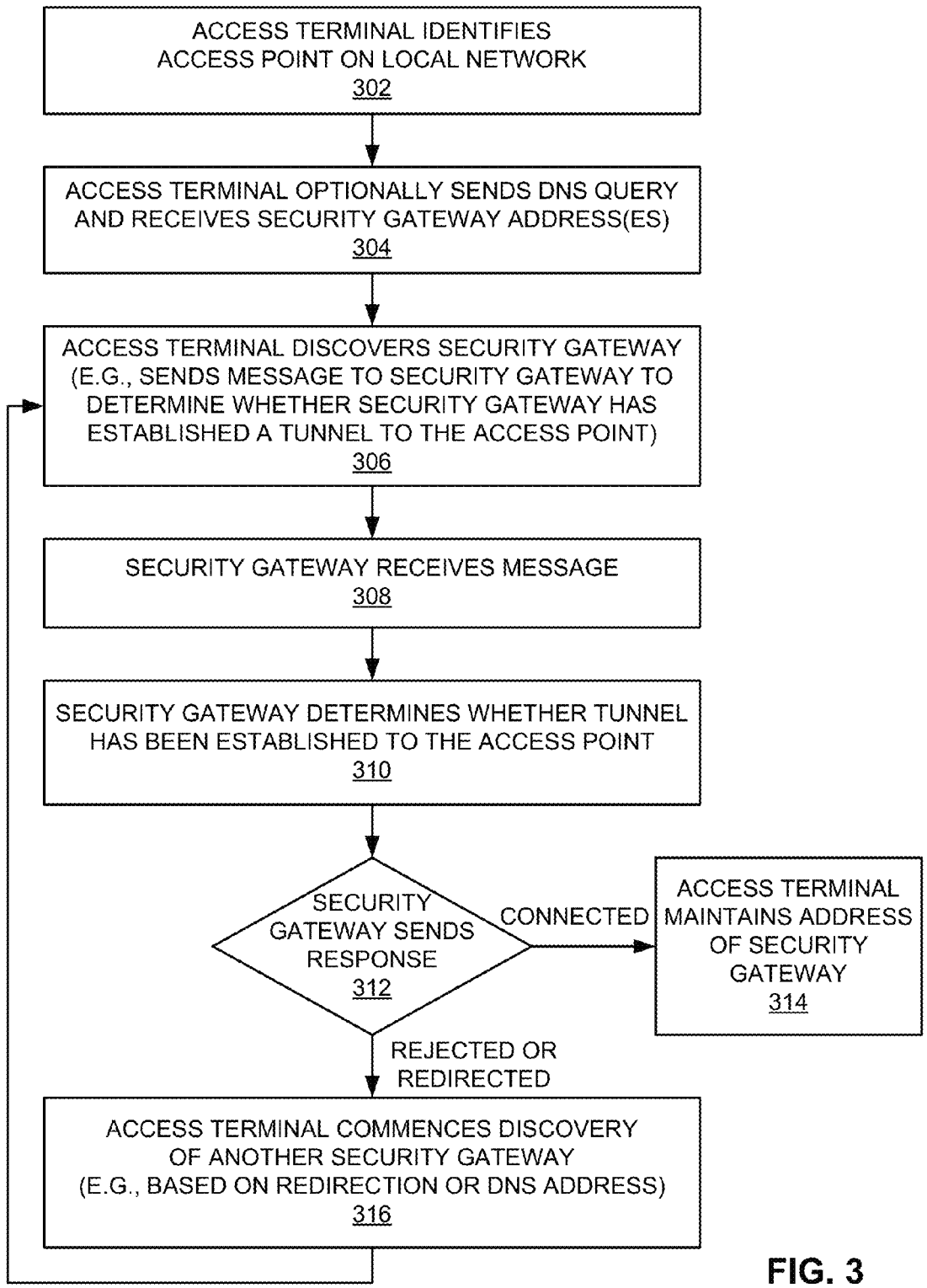
FIG. 3 is a flowchart of several sample aspects of operations that may be performed to discover a security gateway.

As mentioned above, to remotely access a local network associated with an access point, an access terminal may need to discover the security gateway that is being used by the access point. Here, it may be assumed that the security gateway is publically reachable (e.g., a node may reach the security gateway via public IP). FIG. 3 describes two techniques that may be employed to discover a security gateway. One technique involves domain name server (DNS) resolution and multiple retries. The other technique involves security gateway redirection based on, for example, subscription information.

As represented by block 302, the access terminal 102 will have identified an access point on a local network that the access terminal 102 wishes to access. For example, as discussed above in conjunction with block 206, the access terminal 102 may acquire a femto identifier of the femto access point on a home network that the access terminal 102 is allowed to access.

As represented by block 304, in implementations that employ the DNS technique, the access terminal 102 sends a DNS query including a designated domain name of one or more security gateways in the system. In response to this query, the access terminal 102 may receive a list of one or more security gateway addresses. Using this technique, the access terminal 102 may attempt to connect to each IP address sequentially. Here, only the correct security gateway will succeed. If the correct security gateway is found, the access terminal may cache the address information for that security gateway as discussed below. In practice, the addresses returned from the DNS server are usually randomized in a round robin fashion for load balancing. Hence, it is unlikely that a single security gateway will be "hit" constantly if this technique is used.

As represented by block 306, the access terminal 102 initiates discovery for the security gateway. In a case where the DNS technique is used, the access terminal may use an address obtained from the DNS query at this point. Regardless of the technique being used, the access terminal 102 may send a message to a selected security gateway to determine whether that security gateway has established a tunnel to the access point 106. The selected security gateway receives this message from the access terminal 102 as represented by block 308.

As represented by block 310, the security gateway determines whether a tunnel has been established to the access point 106. For example, based on one or more femto identifiers received from the authentication server 114 (e.g., as described above), the security gateway determines whether there is already a pre-setup IPsec tunnel to the corresponding femto access point.

As represented by block 312, the security gateway sends an appropriate response to the access terminal 102 based on the determination of block 310.

If the tunnel has been set up, the tunnel 138 may be established. Here, if the tunnel 142 does not have a CSA associated with remote IP access, the security gateway 112 may request the access point 106 to create another CSA. The security gateway 112 then connects the new CSA with the tunnel 142 to the access terminal 102. As represented by block 314, the access terminal 102 may then maintain the address of the security gateway 112 (e.g., along with a mapping to the access point 106) so that the access terminal 102 may avoid searching for that security gateway in the future.

If the tunnel had not been set up, the security gateway sends an appropriate response to the access terminal 102. For example, in some implementations the security gateway may reject the request from an access terminal (e.g., via an appropriate error code using IKEv2).

Alternatively, in implementations that employ the redirection technique, the security gateway may redirect the access terminal 102 to the correct security gateway. Here, the operator may maintain a database (e.g., redirection database 146) that maps access point identifiers (e.g., femto identifiers) to security gateway addresses. This database is then made accessible for the security gateways in the network. Thus, the security gateway may determine the address of the correct security gateway associated with the designated access point and send that address information to the access terminal 102 in the response.

When a femto is being authenticated at the security gateway, the authentication server 114 may store security addresses for later. Here, different authentication servers (e.g., home AAAs) in the network may have some means to retrieve security gateway addresses associated with femto identifiers from other authentication servers (e.g., femto AAAs) in the network. For example, these different types of authentication servers may be implemented in the same entity or share the same database.

As represented by block 316, as a result of a rejection or a redirection response, the access terminal 102 commences discovery of another security gateway. For example, in an implementation that uses the redirection technique, the access terminal 102 may next access the security gateway corresponding to the address provided in the response. In an implementation that uses the DNS technique, the access terminal 102 may select the next address in the list of addresses that was obtained at block 304.

From the above, it should be appreciated that different discovery techniques may be independently employed or that multiple discovery techniques may be employed in combination. For example, the DNS technique and the redirection technique may be employed in combination since the access terminal does not need to know whether the security gateway can redirect or not. In addition, if the security gateway does not redirect the access terminal, the access terminal can still try the next security gateway IP address on its own.

Referring to FIG. 4, sample aspects of the architecture illustrated by the system 400 will now be described in more detail. The system 400 includes components that are similar to the components of FIG. 1. Specifically, the access terminal 402, the access point 406, the security gateway 412, the communication links 418, 422, 426, 428, and 430, the router 420, and the Internet 424 are similar to similarly named components of FIG. 1. FIG. 4 also shows an example where the access point 404 may connect to a PSDN 408 as represented by a communication link 416 and the PSDN 408 may connect to an operator network 410 as represented by a communication link 418. Other types of network connectively may be used in other implementations as well (e.g., as discussed in FIG. 1).

As in the system 100 of FIG. 1, the system 400 enables a remotely located access terminal 402 to access a local network on which an access point 406 resides. Again, in a typical scenario, the access point 406 is a home femto access point of the access terminal 402 or some other access point that permits access by the access terminal 402.

In this architecture, the access point 406 acts as a virtual private network gateway for a protocol tunnel established with the access terminal 402. In FIG. 4, traffic flow between the access terminal 402 and the access point 406 is represented by dotted line 436 routed via a protocol tunnel (e.g., an IPsec tunnel) as represented by a pair of lines 438. Here, the inner source and destination addresses of a packet sent by the access terminal 402 will have local network addresses (e.g., as assigned by the router 420 through the access point 406 acting as a proxy ARP for the access terminal 402), while the outer source and destination addresses will be, for example, macro IP address of the access terminal 402 and the access point 406, respectively.

Traffic flow between the security gateway 412 and the access point 406 is provided via a protocol tunnel (e.g., an IPsec tunnel) as represented by a pair of lines 448. Here, it may be seen that the tunnel 438 is carried (e.g., encapsulated or layered) within the tunnel 448. Thus, packets arriving at the security gateway 412 from the access point 402 are inserted into the tunnel 448. Accordingly, the outer headers for the tunnel 438 including the outer source and destination addresses described in the preceding paragraph are not removed in this architecture. Rather, another set of outer source and destination addresses are added to the packet and will be, for example, defined by the tunnel 448. Thus, when a packet arrives at the access point 406, two layers of tunnel headers will be removed from the packet to obtain the packet with the source and destination addresses associated with the local network.

Conversely, when sending a packet from the local network to the access terminal 402, the access point 406 encapsulates the packet for transmission via tunnel 438, then encapsulates the resulting packet for transmission via the tunnel 448. The security gateway 412 will then remove the header for the tunnel 448 and route the packet to the access terminal 402. With the above in mind, additional details relating to the operations of the system 400 will be described with reference to the flowchart of FIG. 5.

As represented by block 502, at some point in time a first protocol tunnel is established between the security gateway 412 and the access point 406. The security gateway 412 and the access point 406 each perform corresponding operations to establish the protocol tunnel. This may involve, for example, exchanging messages to allocate cryptographic keys for encrypting and decrypting information sent over the protocol tunnel 448.

As represented by block 504, at some point in time the access terminal 402 and the access point exchange authentication information (e.g., shared authentication information for IKEv2 SA authentication). Advantageously, the authentication information for the tunnel does not need to be preprovisioned in the access terminal 402.

For example, the authentication information may be derived locally while the access terminal is connected over-the-air through the access point 406. Here, if the access terminal is able to access the local network via the access point 406 when connected over-the-air to the access point 406, the access terminal 402 already has access to any IP hosts on the local domain. This capability may thus be preserved when the access terminal is at a remote location.

Various techniques may be employed here. For example, in a first alternative, a Diffie-Hellman key exchange may be performed to generate a pre-shared key (PSK) while the access terminal 402 connects over-the-air locally. In a second alternative, an authenticated Diffie-Hellman key exchange may be performed to generate a pre-shared key (PSK) while the access terminal 402 connects over-the-air locally. In this case, a secret (e.g., password) used for the authentication may be provided to the user during subscription of the user's service. During the Diffie-Hellman exchange, the user may enter this secret on the access terminal 402. The access point 406, in turn, may obtain the secret from the network (e.g., from a AAA entity) during PPP authentication and authorization. A key also could be generated at the network using AAA exchange (where the access point sends its Diffie-Hellman values to the network). After the Diffie-Hellman exchange, the access terminal 402 and the access point share PSK. In a third alternative, EAP-AKA (over PPP) may be used to generate an MSK and the MSK may then be used as the PSK. In a fourth alternative, GBA may be used to generate PSK between the access terminal 402 and the access point 406. Here, the access point 406 may play the role of NAF and contact BSF for bootstrapping. At the end of bootstrapping, the access terminal 402 and the access point 406 share PSK.

The authentication information also may be derived when the access terminal is connected remotely (e.g., through a macro access point or femto access point). For example, the authentication information may be derived during IKEv2 SA establishment between the access terminal 402 and the access point 406 while the access terminal is in macro coverage (e.g., connected to macro access point 404). A shared key may be derived using similar techniques as described in the alternatives above. For the first and second alternative, PSK may be generated during IKEv2 INIT_SA Diffie-Hellman exchange. For the third alternative, EAP-AKA is performed during IKEv2. For the fourth alternative, GBA may be used, with standardized IKEv2 based Ua (NAF-UE) protocol.

The access terminal 402 may acquire the IP address of the access point 406 in various ways. In some implementations, when the access point 406 is registered with the network, the access point 406 may be assigned a fully qualified domain name (FQDN) in a private DNS belonging to the operator. In this case, the access terminal may use this FQDN to reach the access point 406. In some implementations, the access terminal 402 may learn the IP address of the access point 406 when the access terminal 402 connected with the access point 406 over-the-air.

Referring again to FIG. 5, as represented by block 506, the access terminal discovers the access point 406 to be used to access the desired local network. These operations may be similar to the discovery operations described above.

As represented by block 508, in conjunction with establishing the second protocol tunnel (tunnel 438), an address on the local network is obtained for the access terminal 402. As above, the access point 406 may send a request to the router 420 for the local address. In some cases, the access point 406 then sends the local address to the security gateway 412 which, in turn, forwards the local address to the access terminal 402.

As represented by block 510, the access point 406 and the access terminal 402 each perform corresponding operations to establish the second protocol tunnel This may involve, for example, exchanging messages to allocate cryptographic keys for encrypting and decrypting information sent over the protocol tunnel 438.

As represented by block 512, once the protocol tunnel 438 is established, packets may be routed between the access terminal 402 and the access point 406 via the protocol tunnels 438 and 448. For a tunneled packet received from the access terminal 402, the security gateway 412 encapsulated the packets for transmission over the tunnel 448. For a packet received from the access point 406, the security gateway 412 removes the encapsulation for the tunnel 448 and sends the tunneled packet to the access point 406. As above, this may be accomplished using a forwarding policy or some other suitable technique.

Also as above, the access point 406 routes packets between the tunnels 448 and 438 and the local network. For example, when packets are received at the access point 406 via the tunnels, the access point 406 inspects the packets to identify the destination for the packet on the local network. The access point 406 and forwards the packet to the identified destination. FIG. 4 illustrates a sample data path 444 for packet flow between the access point 406 and the local node 434 of the local network (e.g., via the router 420).

Figure 6:
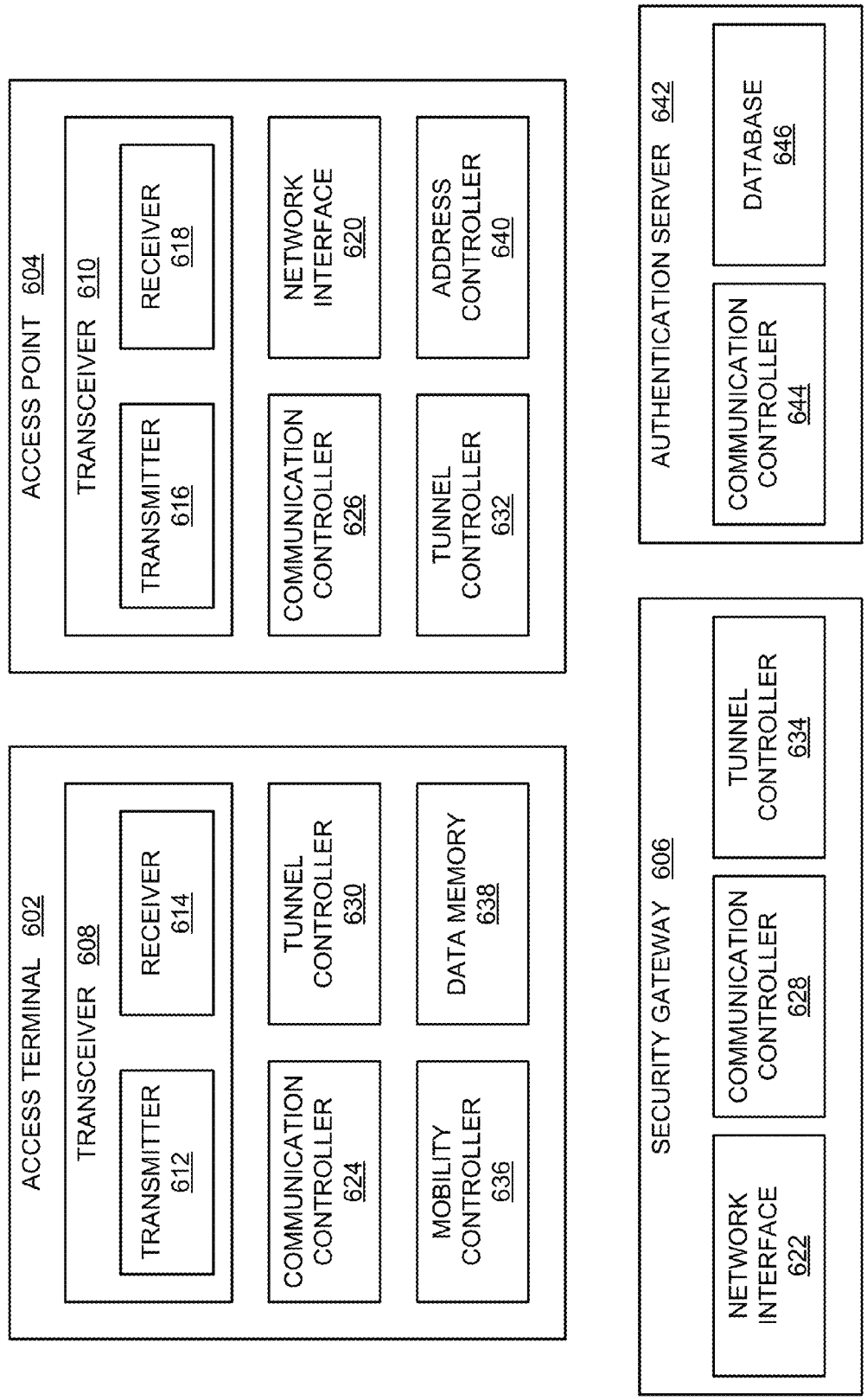
FIG. 6 is a simplified block diagram of several sample aspects of components that may be employed in communication nodes.

FIG. 6 illustrates several sample components that may be incorporated into nodes such as an access terminal 602, an access point 604, a security gateway 606, and an authentication server 642 (e.g., corresponding to the access terminal 102 or 402, the access point 106 or 406, the security gateway 112 or 412, and the authentication server 114, respectively) to perform access operations as taught herein. The described components also may be incorporated into other nodes in a communication system. For example, other nodes in a system may include components similar to those described for the access terminal 602, the access point 604, and the security gateway 606 to provide similar functionality. A given node may contain one or more of the described components. For example, an access terminal may contain multiple transceiver components that enable the access terminal to operate on multiple frequencies and/or communicate via different technologies.

As shown in FIG. 6, the access terminal 602 and the access point 604 may include transceivers 608 and 610, respectively, for communicating with other nodes. The transceiver 608 includes a transmitter 612 for sending signals (e.g., to an access point) and a receiver 614 for receiving signals (e.g., from an access point). Similarly, the transceiver 610 includes a transmitter 616 for sending signals and a receiver 618 for receiving signals.

The access point 604 and the network node 606 also include network interfaces 620 and 622, respectively, for communicating with one another or other network nodes. For example, the network interfaces 620 and 622 may be configured to communicate with one or more network nodes via a wired or wireless backhaul.

The access terminal 602, the access point 604, and the security gateway 606 also include other components that may be used in conjunction with access operations as taught herein. For example, the access terminal 602, the access point 604, the security gateway 606, and the authentication server 114 include communication controllers 624, 626, 628, and 644, respectively, for managing communication with other nodes (e.g., processing and inspecting packets, obtaining authentication information, obtaining identifiers, or sending and receiving packets, messages, requests, addresses, authentication information, responses, or queries) and for providing other related functionality as taught herein. In addition, the access terminal 602, the access point 604, and the security gateway 606 include tunnel controllers 620, 632, and 634, respectively, for establishing tunnels and for providing other related functionality (e.g., accepting or rejecting access terminal access to a tunnel) as taught herein. The access terminal 602 includes a mobility controller 636 for identifying access points to be accessed and for providing other related functionality as taught herein. The access terminal 602 includes a data memory 638 for maintain security gateway addresses and for providing other related functionality as taught herein. The access point 604 includes an address controller 640 for obtaining local addresses and for providing other related functionality as taught herein. The authentication server 642 includes a database 646 for storing subscription information for providing other related functionality as taught herein.

For convenience the access terminal 602 and the access point 604 are shown in FIG. 6 as including components that may be used in the various examples described herein. In practice, one or more of the illustrated components may be implemented in a different way in a different example. As an example, the tunnel controllers 630, 632, and 634 may have different functionality and/or operate in a different manner (e.g., establish tunnels in a different manner) in the implementation of FIG. 1 as compared to the implementation of FIG. 4.

Also, in some implementations the components of FIG. 6 may be implemented in one or more processors (e.g., that uses and/or incorporates data memory). For example, the functionality of blocks 624, 630, 636, and 638 may be implemented by a processor or processors of an access terminal, the functionality of blocks 620, 626, 632, and 640 may be implemented by a processor or processors in of access point, and the functionality of blocks 622, 628, and 624 may be implemented by a processor or processors in a network node.

As discussed above, in some aspects the teachings herein may be employed in a network that includes macro scale coverage (e.g., a large area cellular network such as a 3G network, typically referred to as a macro cell network or a wide area network) and smaller scale coverage (e.g., a residence-based or building-based network environment). As an access terminal moves through such a network, the access terminal may be served in certain locations by access points that provide macro coverage while the access terminal may be served at other locations by access points that provide smaller scale coverage. In some aspects, the smaller coverage access points may be used to provide incremental capacity growth, in-building coverage, and different services (e.g., for a more robust user experience).

In the description herein, a node that provides coverage over a relatively large area may be referred to as a macro access point while a node that provides coverage over a relatively small area (e.g., a residence) may be referred to as a femto access point. It should be appreciated that the teachings herein may be applicable to nodes associated with other types of coverage areas. For example, a pico access point may provide coverage (e.g., coverage within a commercial building) over an area that is smaller than a macro area and larger than a femto area. In various applications, other terminology may be used to reference a macro access point, a femto access point, or other access point-type nodes. For example, a macro access point may be configured or referred to as an access node, base station, access point, eNodeB, macro cell, and so on. Also, a femto access point may be configured or referred to as a Home NodeB, Home eNodeB, access point base station, femto cell, and so on. In some implementations, a node may be associated with (e.g., divided into) one or more cells or sectors. A cell or sector associated with a macro access point, a femto access point, or a pico access point may be referred to as a macro cell, a femto cell, or a pico cell, respectively.

Figure 7:
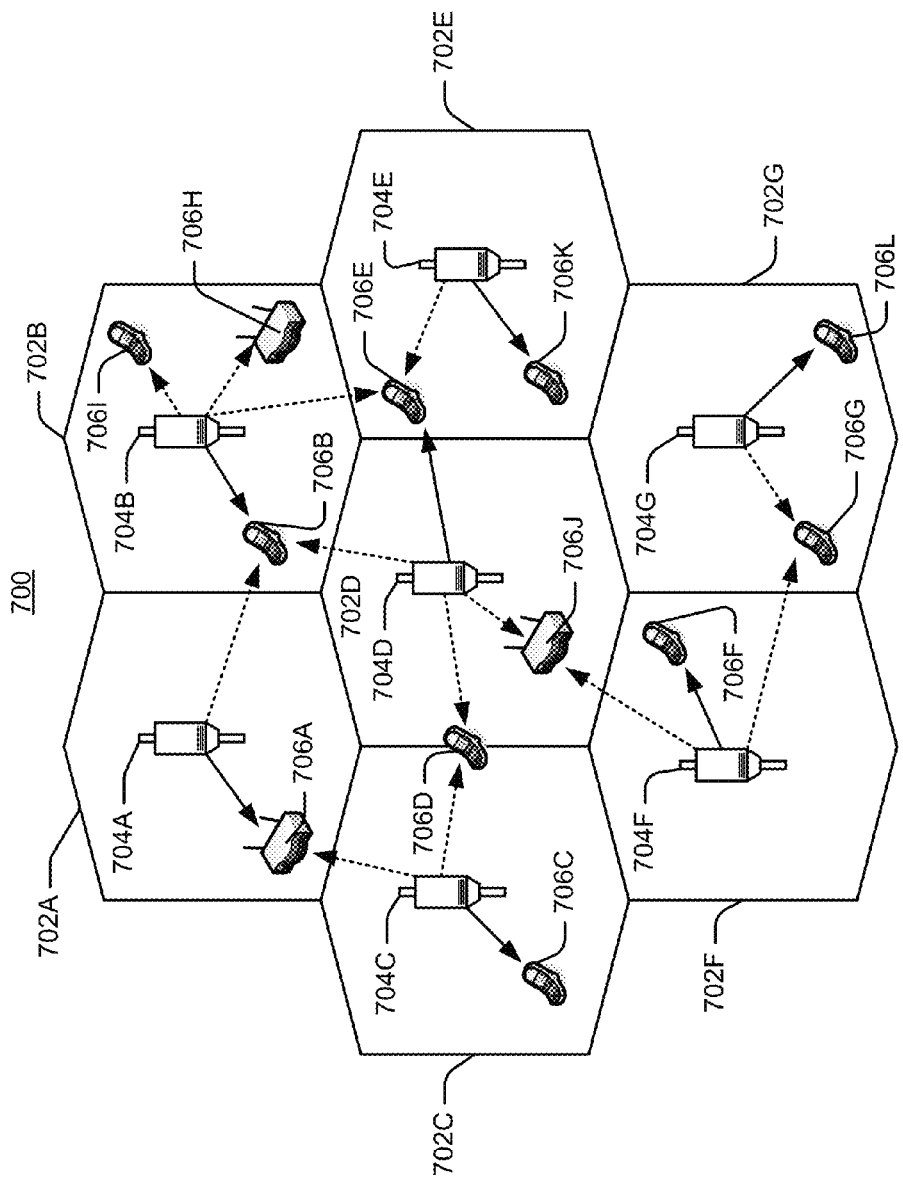
FIG. 7 is a simplified diagram of a wireless communication system.

FIG. 7 illustrates a wireless communication system 700, configured to support a number of users, in which the teachings herein may be implemented. The system 700 provides communication for multiple cells 702, such as, for example, macro cells 702A-702G, with each cell being serviced by a corresponding access point 704 (e.g., access points 704A-704G). As shown in FIG. 7, access terminals 706 (e.g., access terminals 706A-706L) may be dispersed at various locations throughout the system over time. Each access terminal 706 may communicate with one or more access points 704 on a forward link (FL) and/or a reverse link (RL) at a given moment, depending upon whether the access terminal 706 is active and whether it is in soft handoff, for example. The wireless communication system 700 may provide service over a large geographic region. For example, macro cells 702A-702G may cover a few blocks in a neighborhood or several miles in rural environment.

Figure 8:
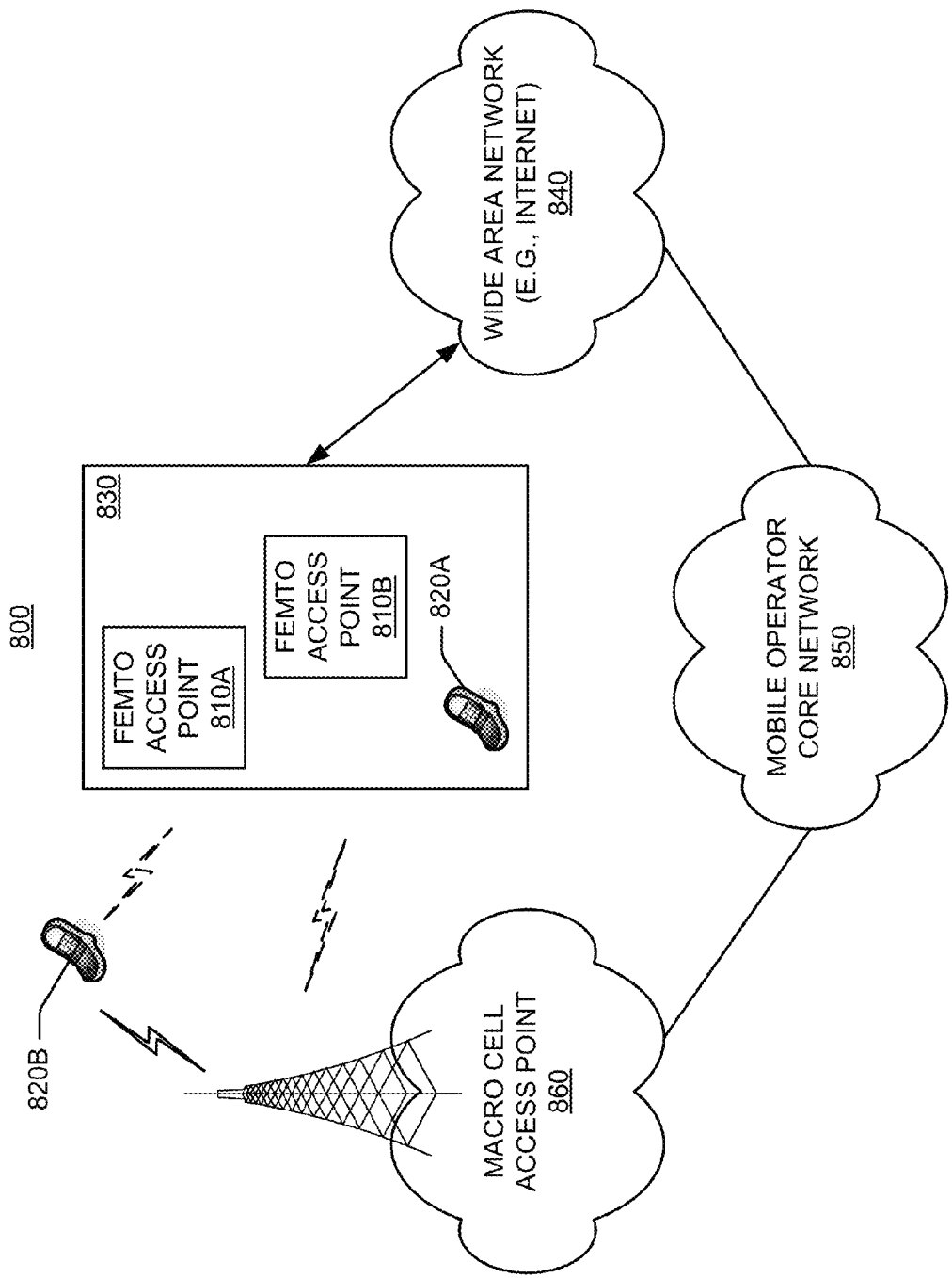
FIG. 8 is a simplified diagram of a wireless communication system including femto access points.

FIG. 8 illustrates an exemplary communication system 800 where one or more femto access points are deployed within a network environment. Specifically, the system 800 includes multiple femto access points 810 (e.g., femto access points 810A and 810B) installed in a relatively small scale network environment (e.g., in one or more user residences 830). Each femto access point 810 may be coupled to a wide area network 840 (e.g., the Internet) and a mobile operator core network 850 via a DSL router, a cable modem, a wireless link, or other connectivity means (not shown). As will be discussed below, each femto access point 810 may be configured to serve associated access terminals 820 (e.g., access terminal 820A) and, optionally, other (e.g., hybrid or alien) access terminals 820 (e.g., access terminal 820B). In other words, access to femto access points 810 may be restricted whereby a given access terminal 820 may be served by a set of designated (e.g., home) femto access point(s) 810 but may not be served by any non-designated femto access points 810 (e.g., a neighbor's femto access point 810).

Figure 9:
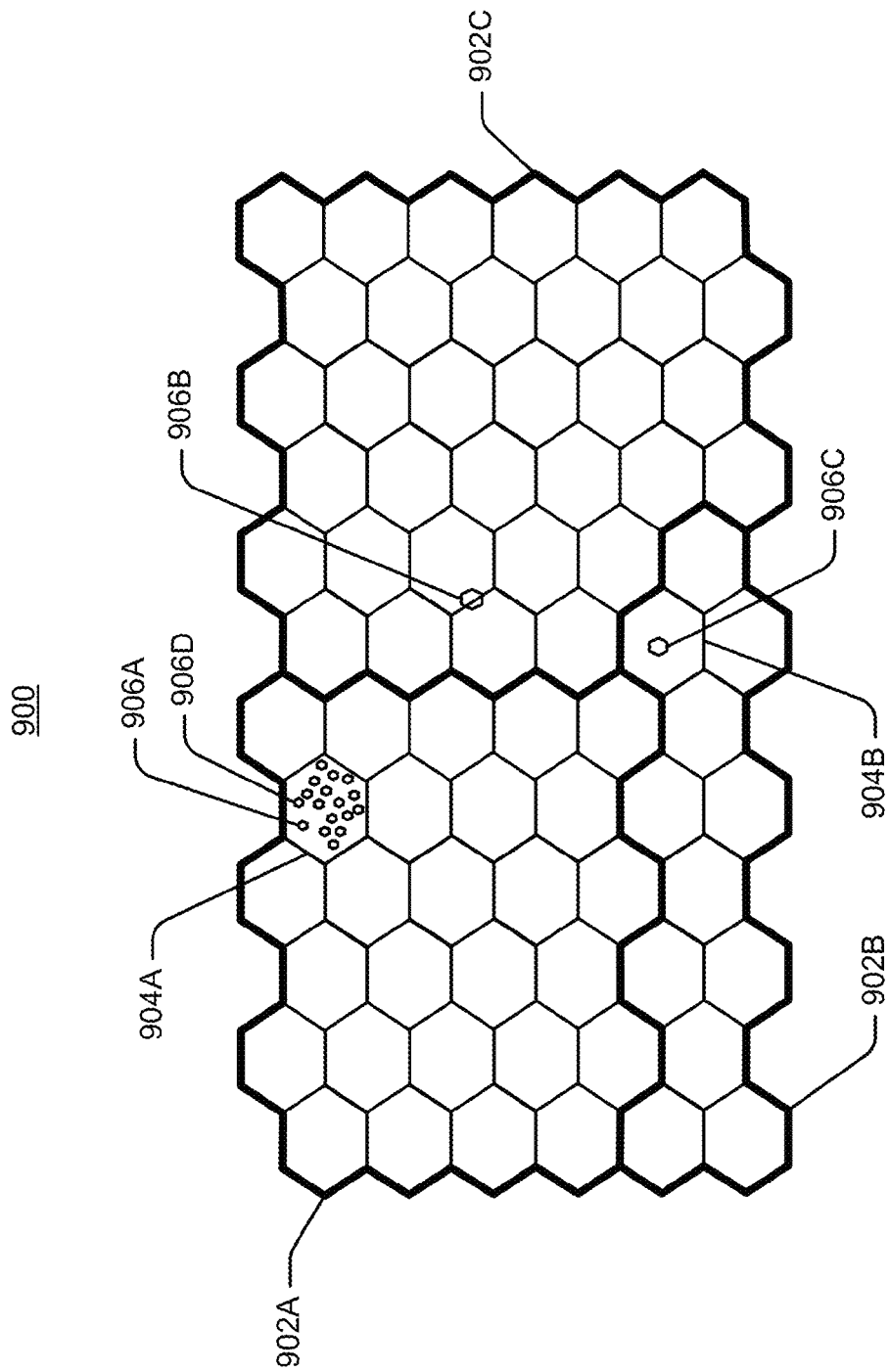
FIG. 9 is a simplified diagram illustrating coverage areas for wireless communication.

FIG. 9 illustrates an example of a coverage map 900 where several tracking areas 902 (or routing areas or location areas) are defined, each of which includes several macro coverage areas 904. Here, areas of coverage associated with tracking areas 902A, 902B, and 902C are delineated by the wide lines and the macro coverage areas 904 are represented by the larger hexagons. The tracking areas 902 also include femto coverage areas 906. In this example, each of the femto coverage areas 906 (e.g., femto coverage area 906C) is depicted within one or more macro coverage areas 904 (e.g., macro coverage area 904B). It should be appreciated, however, that some or all of a femto coverage area 906 may not lie within a macro coverage area 904. In practice, a large number of femto coverage areas 906 may be defined with a given tracking area 902 or macro coverage area 904. Also, one or more pico coverage areas (not shown) may be defined within a given tracking area 902 or macro coverage area 904.

Referring again to FIG. 8, the owner of a femto access point 810 may subscribe to mobile service, such as, for example, 3G mobile service, offered through the mobile operator core network 850. In addition, an access terminal 820 may be capable of operating both in macro environments and in smaller scale (e.g., residential) network environments. In other words, depending on the current location of the access terminal 820, the access terminal 820 may be served by a macro cell access point 860 associated with the mobile operator core network 850 or by any one of a set of femto access points 810 (e.g., the femto access points 810A and 810B that reside within a corresponding user residence 830). For example, when a subscriber is outside his home, he is served by a standard macro access point (e.g., access point 860) and when the subscriber is at home, he is served by a femto access point (e.g., access point 810A). Here, a femto access point 810 may be backward compatible with legacy access terminals 820.

A femto access point 810 may be deployed on a single frequency or, in the alternative, on multiple frequencies. Depending on the particular configuration, the single frequency or one or more of the multiple frequencies may overlap with one or more frequencies used by a macro access point (e.g., access point 860).

In some aspects, an access terminal 820 may be configured to connect to a preferred femto access point (e.g., the home femto access point of the access terminal 820) whenever such connectivity is possible. For example, whenever the access terminal 820A is within the user's residence 830, it may be desired that the access terminal 820A communicate only with the home femto access point 810A or 810B.

In some aspects, if the access terminal 820 operates within the macro cellular network 850 but is not residing on its most preferred network (e.g., as defined in a preferred roaming list), the access terminal 820 may continue to search for the most preferred network (e.g., the preferred femto access point 810) using a better system reselection (BSR) procedure, which may involve a periodic scanning of available systems to determine whether better systems are currently available and subsequently acquire such preferred systems. The access terminal 820 may limit the search for specific band and channel. For example, one or more femto channels may be defined whereby all femto access points (or all restricted femto access points) in a region operate on the femto channel(s). The search for the most preferred system may be repeated periodically. Upon discovery of a preferred femto access point 810, the access terminal 820 selects the femto access point 810 and registers on it for use when within its coverage area.

Access to a femto access point may be restricted in some aspects. For example, a given femto access point may only provide certain services to certain access terminals. In deployments with so-called restricted (or closed) access, a given access terminal may only be served by the macro cell mobile network and a defined set of femto access points (e.g., the femto access points 810 that reside within the corresponding user residence 830). In some implementations, an access point may be restricted to not provide, for at least one access point, at least one of: signaling, data access, registration, paging, or service.

In some aspects, a restricted femto access point (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., femto access points) that share a common access control list of access terminals.

Various relationships may thus exist between a given femto access point and a given access terminal. For example, from the perspective of an access terminal, an open femto access point may refer to a femto access point with unrestricted access (e.g., the femto access point allows access to any access terminal). A restricted femto access point may refer to a femto access point that is restricted in some manner (e.g., restricted for access and/or registration). A home femto access point may refer to a femto access point on which the access terminal is authorized to access and operate on (e.g., permanent access is provided for a defined set of one or more access terminals). A guest (or hybrid) femto access point may refer to a femto access point on which an access terminal is temporarily authorized to access or operate on. An alien femto access point may refer to a femto access point on which the access terminal is not authorized to access or operate on, except for perhaps emergency situations (e.g., 911 calls).

From a restricted femto access point perspective, a home access terminal may refer to an access terminal that is authorized to access the restricted femto access point installed in the residence of that access terminal's owner (usually the home access terminal has permanent access to that femto access point). A guest access terminal may refer to an access terminal with temporary access to the restricted femto access point (e.g., limited based on deadline, time of use, bytes, connection count, or some other criterion or criteria). An alien access terminal may refer to an access terminal that does not have permission to access the restricted femto access point, except for perhaps emergency situations, for example, such as 911 calls (e.g., an access terminal that does not have the authentication information or permission to register with the restricted femto access point).

For convenience, the disclosure herein describes various functionality in the context of a femto access point. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min \{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 10:
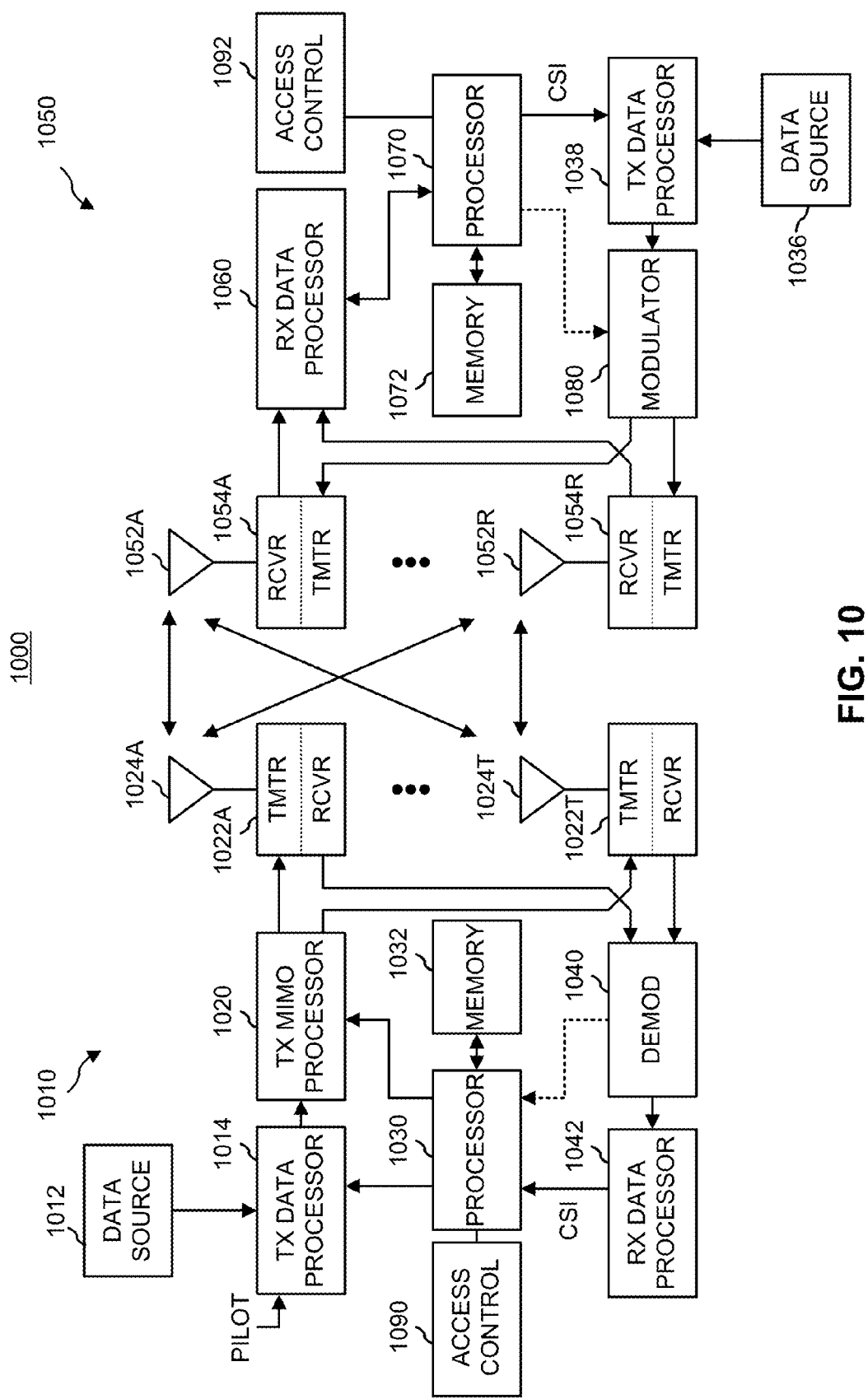
FIG. 10 is a simplified block diagram of several sample aspects of communication components.
Figure 11:
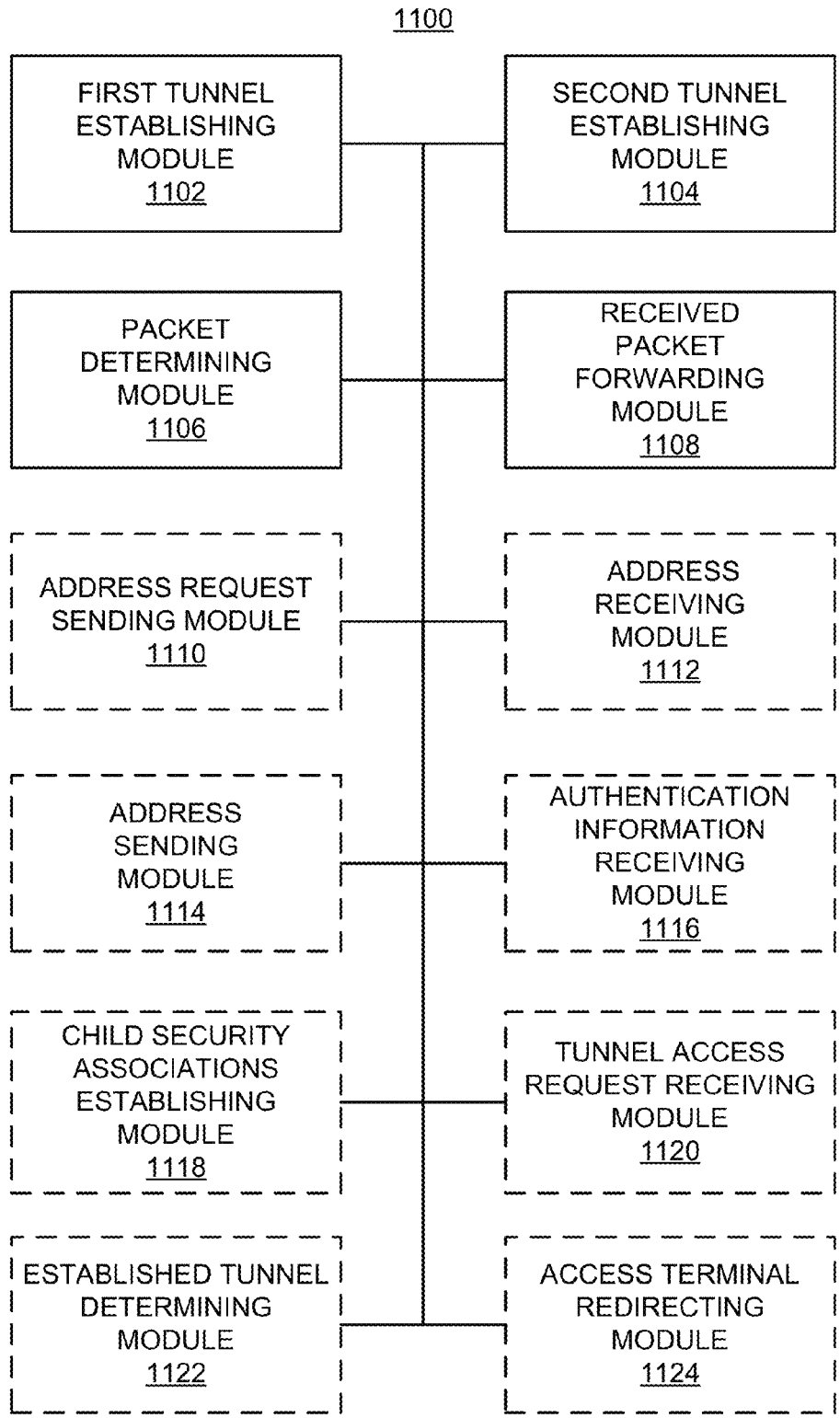
FIGS. 11-16 are simplified block diagrams of several sample aspects of apparatuses configured to facilitate remote access to a local network as taught herein.
Figure 12:
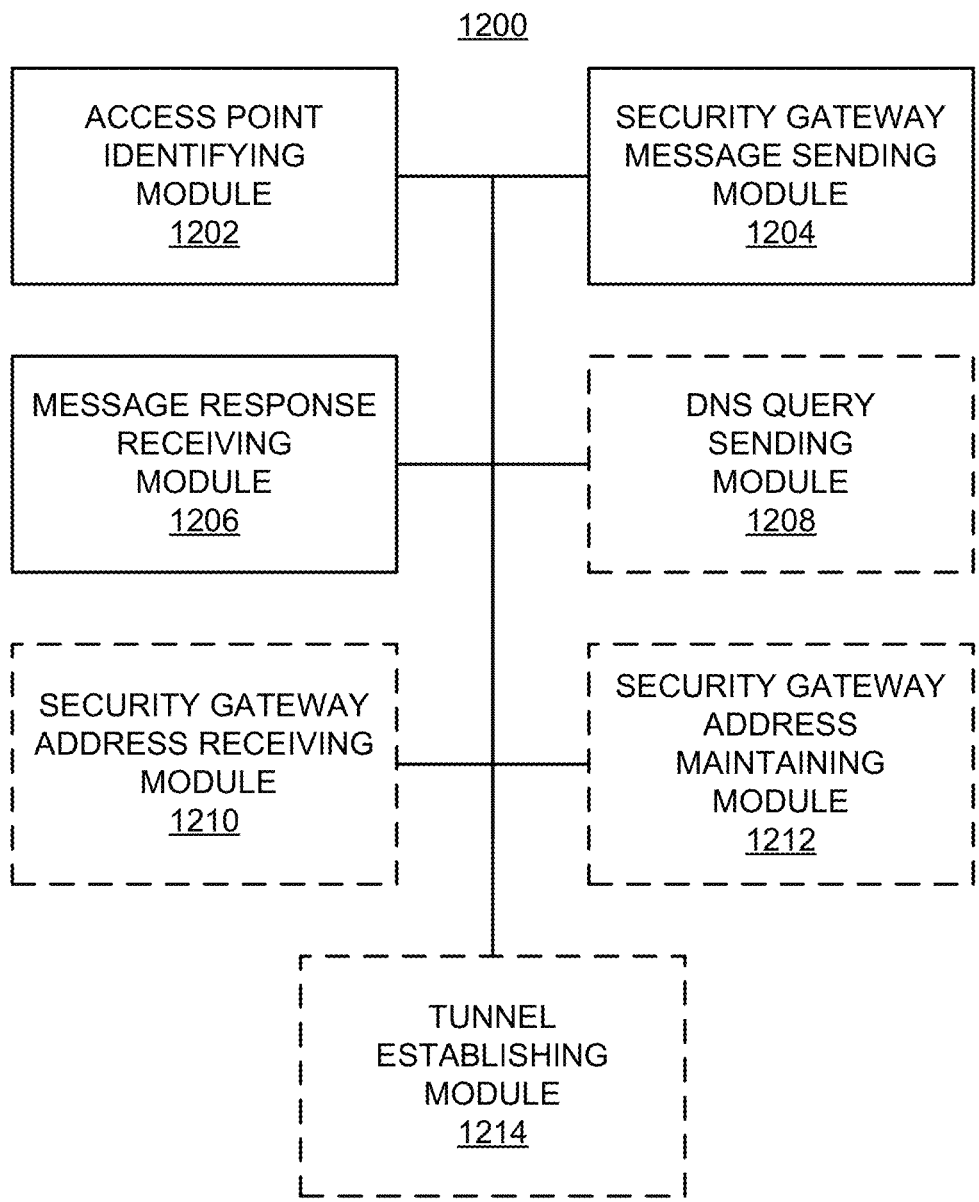
Figure 13:
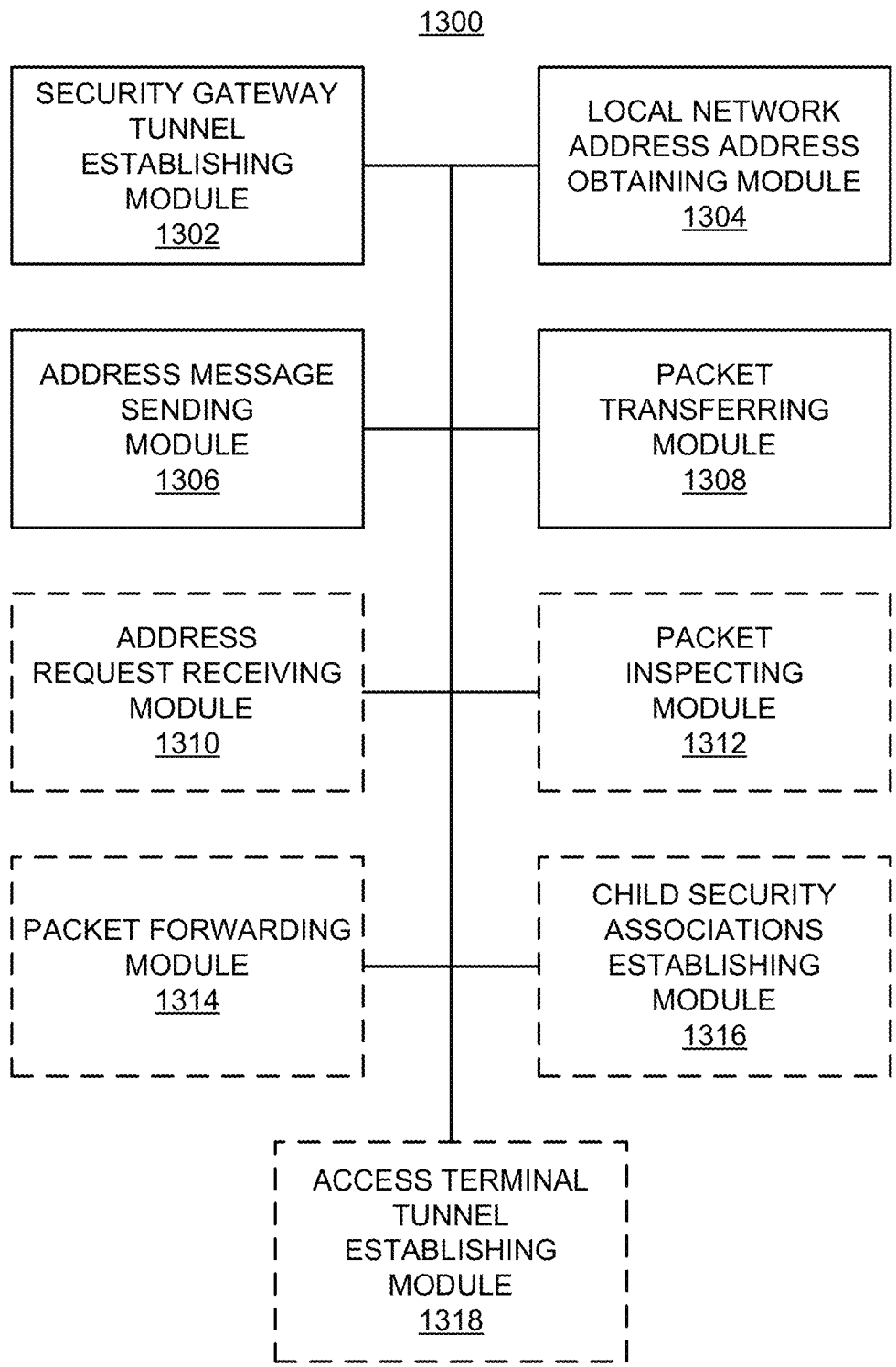
Figure 14:
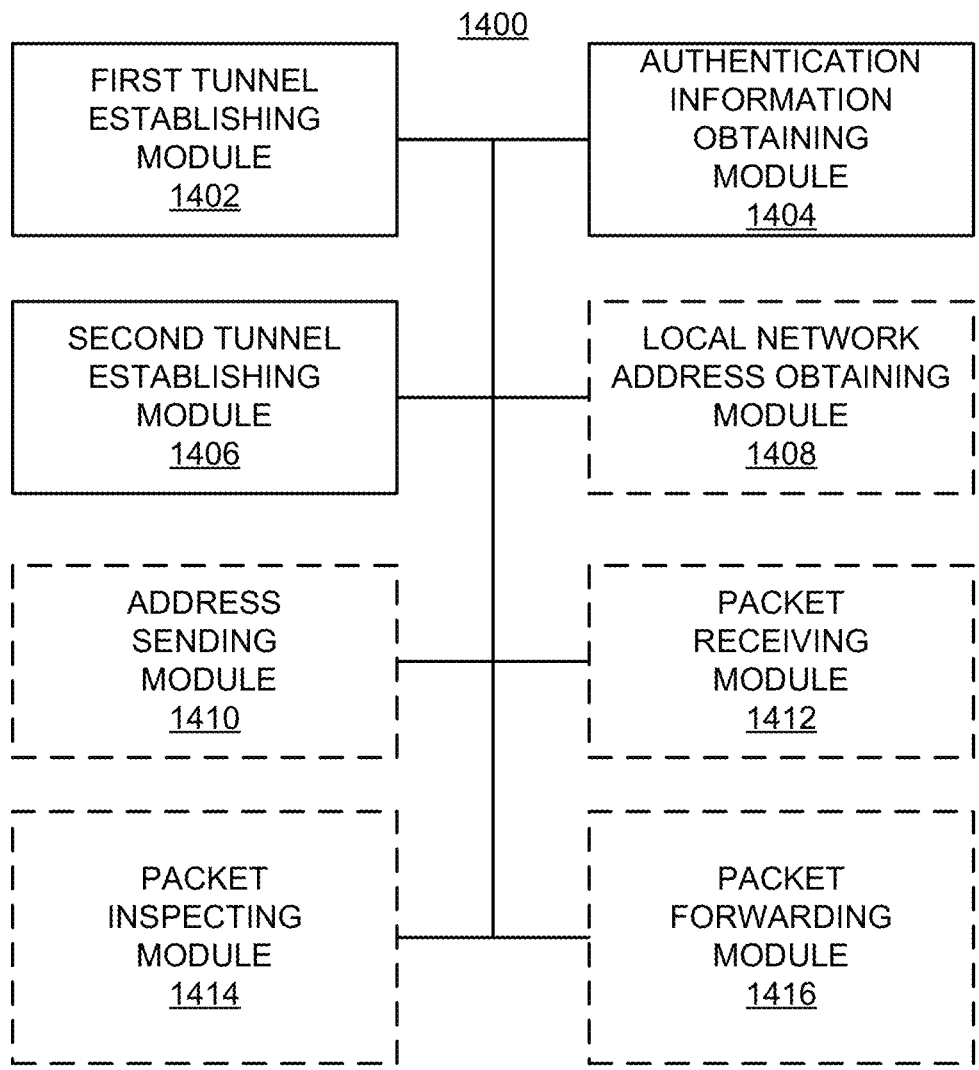
Figure 15:
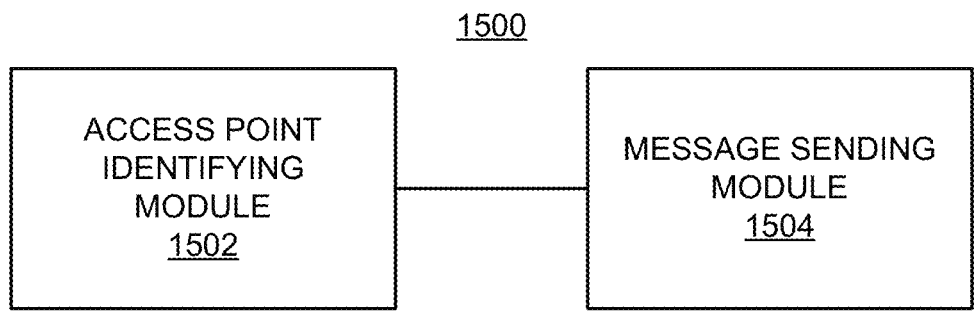
Figure 16:
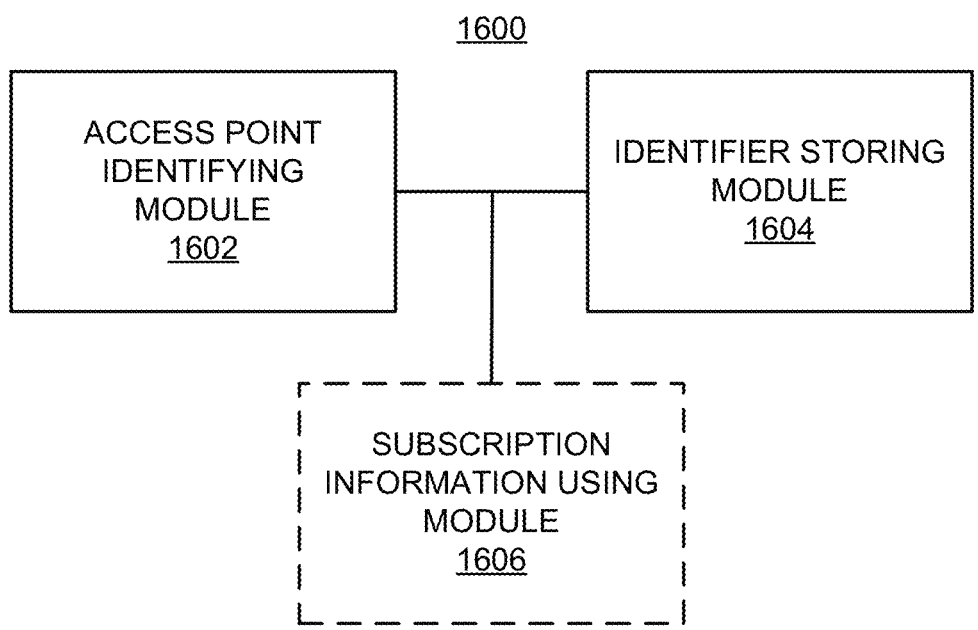

FIG. 10 illustrates a wireless device 1010 (e.g., an access point) and a wireless device 1050 (e.g., an access terminal) of a sample MIMO system 1000. At the device 1010, traffic data for a number of data streams is provided from a data source 1012 to a transmit (TX) data processor 1014. Each data stream may then be transmitted over a respective transmit antenna.

The TX data processor 1014 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1030. A data memory 1032 may store program code, data, and other information used by the processor 1030 or other components of the device 1010.

The modulation symbols for all data streams are then provided to a TX MIMO processor 1020, which may further process the modulation symbols (e.g., for OFDM). The TX MIMO processor 1020 then provides $N_T$ modulation symbol streams to $N_T$ transceivers (XCVR) 1022A through 1022T. In some aspects, the TX MIMO processor 1020 applies beam-forming weights to the symbols of the data streams and to the antenna from which the symbol is being transmitted.

Each transceiver 1022 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1022A through 1022T are then transmitted from $N_T$ antennas 1024A through 1024T, respectively.

At the device 1050, the transmitted modulated signals are received by $N_R$ antennas 1052A through 1052R and the received signal from each antenna 1052 is provided to a respective transceiver (XCVR) 1054A through 1054R. Each transceiver 1054 conditions (e.g., filters, amplifies, and downconverts) a respective received signal, digitizes the conditioned signal to provide samples, and further processes the samples to provide a corresponding "received" symbol stream.

A receive (RX) data processor 1060 then receives and processes the $N_R$ received symbol streams from $N_R$ transceivers 1054 based on a particular receiver processing technique to provide $N_T$ "detected" symbol streams. The RX data processor 1060 then demodulates, deinterleaves, and decodes each detected symbol stream to recover the traffic data for the data stream. The processing by the RX data processor 1060 is complementary to that performed by the TX MIMO processor 1020 and the TX data processor 1014 at the device 1010.

A processor 1070 periodically determines which pre-coding matrix to use (discussed below). The processor 1070 formulates a reverse link message comprising a matrix index portion and a rank value portion. A data memory 1072 may store program code, data, and other information used by the processor 1070 or other components of the device 1050.

The reverse link message may comprise various types of information regarding the communication link and/or the received data stream. The reverse link message is then processed by a TX data processor 1038, which also receives traffic data for a number of data streams from a data source 1036, modulated by a modulator 1080, conditioned by the transceivers 1054A through 1054R, and transmitted back to the device 1010.

At the device 1010, the modulated signals from the device 1050 are received by the antennas 1024, conditioned by the transceivers 1022, demodulated by a demodulator (DEMOD) 1040, and processed by a RX data processor 1042 to extract the reverse link message transmitted by the device 1050. The processor 1030 then determines which pre-coding matrix to use for determining the beam-forming weights then processes the extracted message.

FIG. 10 also illustrates that the communication components may include one or more components that perform access control operations as taught herein. For example, an access control component 1090 may cooperate with the processor 1030 and/or other components of the device 1010 to send/receive signals to/from another device (e.g., device 1050) as taught herein. Similarly, an access control component 1092 may cooperate with the processor 1070 and/or other components of the device 1050 to send/receive signals to/from another device (e.g., device 1010). It should be appreciated that for each device 1010 and 1050 the functionality of two or more of the described components may be provided by a single component. For example, a single processing component may provide the functionality of the access control component 1090 and the processor 1030 and a single processing component may provide the functionality of the access control component 1092 and the processor 1070. In some implementations, the processor 1030 and the memory 1032 may collectively provide access-related and other functionality as taught herein for the device 1010, and the processor 1070 and the memory 1072 may collectively provide access-related and other functionality as taught herein for the device 1050.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Re199, Re15, Re16, Re17) technology, as well as 3GPP2 (e.g., 1xRTT, 1xEV-DO RelO, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The functionality described herein (e.g., with regard to one or more of the accompanying figures) may correspond in some aspects to similarly designated "means for" functionality in the appended claims. Referring to FIGS. 11-14, apparatuses 1100, 1200, 1300, and 1400 are represented as a series of interrelated functional modules. Here, a first tunnel establishing module 1102, a second tunnel establishing module 1104, a child security associations establishing module 1118, a tunnel access request receiving module 1120, an established tunnel determining module 1122, and an access terminal redirecting module 1124 may correspond at least in some aspects to, for example, a tunnel controller as discussed herein. A packet determining module 1106, a received packet forwarding module 1108, an address request sending module 1110, an address receiving module 1112, an address sending module 1114, an authentication information receiving module 1116 may correspond at least in some aspects to, for example, a communication controller as discussed herein. An access point identifying module 1202 may correspond at least in some aspects to, for example, a mobility controller as discussed herein. A security gateway message sending module 1204, a message response receiving module 1206, a DNS query sending module 1208, and a security gateway address receiving module 1210 may correspond at least in some aspects to, for example, a communication controller as discussed herein. A security gateway address maintaining module 1212 may correspond at least in some aspects to, for example, a data memory as discussed herein. A tunnel establishing module 1214 may correspond at least in some aspects to, for example, a tunnel controller as discussed herein. A security gateway tunnel establishing module 1302, a child security associations establishing module 1316, and an access terminal tunnel establishing module 1318 may correspond at least in some aspects to, for example, a tunnel controller as discussed herein. A local network address obtaining module 1304 may correspond at least in some aspects to, for example, an address controller as discussed herein. An address message sending module 1306, a packet transferring module 1308, an address request receiving module 1310, a packet inspecting module 1312, and a packet forwarding module 1314 may correspond at least in some aspects to, for example, a communication controller as discussed herein. A first tunnel establishing module 1402 and a second tunnel establishing module 1406 may correspond at least in some aspects to, for example, a tunnel controller as discussed herein. An authentication information obtaining module 1404, a packet receiving module 1412, a packet inspecting module 1414 and a packet forwarding module 1416 may correspond at least in some aspects to, for example, a communication controller as discussed herein. A local network address obtaining module 1408 and an address sending module 1410 may correspond at least in some aspects to, for example, an address controller as discussed herein. An access point identifying module 1502 may correspond at least in some aspects to, for example, a mobility controller as discussed herein. A message sending module 1504 may correspond at least in some aspects to, for example, a communication controller as discussed herein. An access point identifying module 1602 may correspond at least in some aspects to, for example, a communication controller as discussed herein. An identifier storing module 1604 may correspond at least in some aspects to, for example, a database as discussed herein. A subscription information using module 1606 may correspond at least in some aspects to, for example, a database as discussed herein.

The functionality of the modules of FIGS. 11-14 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIGS. 11-14 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
   establishing a first protocol tunnel between an access point on a local network and a security gateway;
   obtaining an address on the local network for an access terminal to enable the access terminal to remotely access the local network via the first protocol tunnel;
   establishing a second protocol tunnel between the access point and the access terminal via the first protocol tunnel such that at least a portion of the second protocol tunnel is established within the first protocol tunnel;
   sending a message including the address of the access terminal from the access point to the security gateway via the first protocol tunnel;
   receiving a packet from the local network at the access point; and
   transmitting the packet via the second protocol tunnel to the security gateway, wherein the security gateway forwards the packet to the access terminal.

2. The method of claim 1, wherein the obtaining of the address comprises sending a request for the address to a local router on the local network.

3. The method of claim 1, further comprising receiving a request for the address from the security gateway, wherein the address is obtained in response to the request.

4. The method of claim 1, further comprising:
inspecting the packet to identify a destination for the packet on the local network; and
forwarding the packet to the identified destination.

5. The method of claim 1, further comprising establishing a plurality of child security associations based on the first protocol tunnel, wherein a first one of the child security associations is for carrying traffic between the access point and an operator core network and a second one of the child security associations is for carrying traffic between the access point and the access terminal.

6. The method of claim 1, wherein the access point comprises a femto access point.

7. The method of claim 1, wherein the first protocol tunnel comprises an IPsec tunnel.

8. An apparatus for communication, comprising:
a tunnel controller configured to establish a first protocol tunnel between an access point on a local network and a security gateway;
an address controller configured to obtain an address on the local network for an access terminal to enable the access terminal to remotely access the local network via the first protocol tunnel;
the tunnel controller further configured to establish a second protocol tunnel between the access point and the access terminal via the first protocol tunnel such that at least a portion of the second protocol tunnel is established within the first protocol tunnel;
a communication controller configured to:
send a message including the address of the access terminal from the access point to the security gateway via the first protocol tunnel;
receive a packet from the local network at the access point; and
transmit the packet via the second protocol tunnel to the security gateway, wherein the security gateway forwards the packet to the access terminal.

9. The apparatus of claim 8, wherein the obtaining of the address comprises sending a request for the address to a local router on the local network.

10. The apparatus of claim 8, wherein the communication controller is further configured to:
inspect the packet to identify a destination for the packet on the local network; and
forward the packet to the identified destination.

11. The apparatus of claim 8, wherein:
the tunnel controller is further configured to establish a plurality of child security associations based on the first protocol tunnel; and
a first one of the child security associations is for carrying traffic between the access point and an operator core network and a second one of the child security associations is for carrying traffic between the access point and the access terminal.

12. An apparatus for communication, comprising:
means for establishing a first protocol tunnel between an access point on a local network and a security gateway;
means for obtaining an address on the local network for an access terminal to enable the access terminal to remotely access the local network via the first protocol tunnel;
means for establishing a second protocol tunnel between the access point and the access terminal via the first protocol tunnel such that at least a portion of the second protocol tunnel is established within the first protocol tunnel;
means for sending a message including the address of the access terminal from the access point to the security gateway via the first protocol tunnel;
means for receiving a packet from the local network at the access point; and
means for transmitting the packet via the second protocol tunnel to the security, wherein the security gateway forwards the packet to the access terminal.

13. The apparatus of claim 12, wherein the obtaining of the address comprises sending a request for the address to a local router on the local network.

14. The apparatus of claim 12, further comprising:
means for inspecting the packet to identify a destination for the packet on the local network; and
means for forwarding the packet to the identified destination.

15. The apparatus of claim 12, further comprising means for establishing a plurality of child security associations based on the first protocol tunnel, wherein a first one of the child security associations is for carrying traffic between the access point and an operator core network and a second one of the child security associations is for carrying traffic between the access point and the access terminal.

16. A computer-program product, comprising:
a non-transitory computer-readable medium comprising code for causing a computer to:
establish a first protocol tunnel between an access point on a local network and a security gateway;
obtain an address on the local network for an access terminal to enable the access terminal to remotely access the local network via the first protocol tunnel;
establish a second protocol tunnel between the access point and the access terminal via the first protocol tunnel such that at least a portion of the second protocol tunnel is established within the first protocol tunnel;
send a message including the address of the access terminal from the access point to the security gateway via the first protocol tunnel;
receive a packet from the local network at the access point; and
transmit the packet via the second protocol tunnel to the security gateway, wherein the security gateway forwards the packet to the access terminal.

17. The computer-program product of claim 16, wherein the obtaining of the address comprises sending a request for the address to a local router on the local network.

18. The computer-program product of claim 16, wherein the computer-readable medium further comprises code for causing the computer to:
inspect the packet to identify a destination for the packet on the local network; and
forward the packet to the identified destination.

19. The computer-program product of claim 16, wherein:
the computer-readable medium further comprises code for causing the computer to establish a plurality of child security associations based on the first protocol tunnel; and
a first one of the child security associations is for carrying traffic between the access point and an operator core network and a second one of the child security associations is for carrying traffic between the access point and the access terminal.

20. A method of communication, comprising:
  establishing a first protocol tunnel between an access point on a local network and a security gateway;
  obtaining authentication information for establishing a second protocol tunnel between the access point and an access terminal;
  establishing the second protocol tunnel between the access point and the access terminal via the first protocol tunnel such that at least a portion of the second protocol tunnel is established within the first protocol tunnel;
  receiving a packet from the access point at the security gateway; and
  forwarding the packet via the second protocol tunnel to the access terminal.

21. The method of claim 20, wherein the authentication information is obtained by communicating with the access terminal via a wireless connection.

22. The method of claim 20, wherein the authentication information is obtained via an Internet key exchange procedure.

23. The method of claim 20, further comprising:
  obtaining an address on the local network for the access terminal to enable the access terminal to remotely access the local network; and
  sending the address to the access terminal via the first protocol tunnel.

24. The method of claim 23, wherein the address is obtained by sending a request for the address to a local router on the local network.

25. The method of claim 20, further comprising:
  receiving a packet from the access terminal via the second protocol tunnel;
  inspecting the packet to identify a destination for the packet on the local network; and
  forwarding the packet to the identified destination.

26. The method of claim 20, wherein the access point comprises a femto access point.

27. The method of claim 20, wherein the first and second protocol tunnels comprise IPsec tunnels.

28. An apparatus for communication, comprising:
  a tunnel controller configured to establish a first protocol tunnel between an access point on a local network and a security gateway;
  a communication controller configured to obtain authentication information for establishing a second protocol tunnel between the access point and an access terminal;
  wherein the tunnel controller is further configured to establish the second protocol tunnel between the access point and the access terminal via the first protocol tunnel such that at least a portion of the second protocol tunnel is established within the first protocol tunnel; and
  wherein the communication controller is further configured to receive a packet from the access point at the security gateway, and forward the packet via the second protocol tunnel to the access terminal.

29. The apparatus of claim 28, further comprising an address controller configured to:
  obtain an address on the local network for the access terminal to enable the access terminal to remotely access the local network; and
  send the address to the access terminal via the first protocol tunnel.

30. The apparatus of claim 29, wherein the address is obtained by sending a request for the address to a local router on the local network.

31. The apparatus of claim 28, wherein the communication controller is further configured to:
  receive a packet from the access terminal via the second protocol tunnel;
  inspect the packet to identify a destination for the packet on the local network; and
  forward the packet to the identified destination.

32. An apparatus for communication, comprising:
  means for establishing a first protocol tunnel between an access point on a local network and a security gateway;
  means for obtaining authentication information for establishing a second protocol tunnel between the access point and an access terminal;
  means for establishing the second protocol tunnel between the access point and the access terminal via the first protocol tunnel such that at least a portion of the second protocol tunnel is established within the first protocol tunnel;
  means for receiving a packet from the access point at the security gateway; and
  means for forwarding the packet via the second protocol tunnel to the access terminal.

33. The apparatus of claim 32, further comprising:
  means for obtaining an address on the local network for the access terminal to enable the access terminal to remotely access the local network; and
  means for sending the address to the access terminal via the first protocol tunnel.

34. The apparatus of claim 33, wherein the address is obtained by sending a request for the address to a local router on the local network.

35. The apparatus of claim 32, further comprising:
  means for receiving a packet from the access terminal via the second protocol tunnel;
  means for inspecting the packet to identify a destination for the packet on the local network; and
  means for forwarding the packet to the identified destination.

36. A computer-program product, comprising:
  a non-transitory computer-readable medium comprising code for causing a computer to:
    establish a first protocol tunnel between an access point on a local network and a security gateway;
    obtain authentication information for establishing a second protocol tunnel between the access point and an access terminal;
    establish the second protocol tunnel between the access point and the access terminal via the first protocol tunnel such that at least a portion of the second protocol tunnel is established within the first protocol tunnel;
    receive a packet from the access point at the security gateway; and
    forward the packet via the second protocol tunnel to the access terminal.

37. The computer-program product of claim 36, wherein the computer-readable medium further comprises code for causing the computer to:
  obtain an address on the local network for the access terminal to enable the access terminal to remotely access the local network; and
  send the address to the access terminal via the first protocol tunnel.

38. The computer-program product of claim 37, wherein the address is obtained by sending a request for the address to a local router on the local network.

39. The computer-program product of claim 36, wherein the computer-readable medium further comprises code for causing the computer to:
- receive a packet from the access terminal via the second protocol tunnel;
- inspect the packet to identify a destination for the packet on the local network; and
- forward the packet to the identified destination.

* * * * *